(12) United States Patent
Smith et al.

(10) Patent No.: US 9,130,907 B2
(45) Date of Patent: *Sep. 8, 2015

(54) SWITCH FOR COMMUNICATING DATA IN A DYNAMIC COMPUTER NETWORK

(75) Inventors: Wayne B. Smith, Melbourne Beach, FL (US); Charles Powers, Melbourne, FL (US); Margaret Knepper, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 645 days.

This patent is subject to a terminal disclaimer.

(21) Appl. No.: 13/461,022

(22) Filed: May 1, 2012

(65) Prior Publication Data

US 2013/0294446 A1 Nov. 7, 2013

(51) Int. Cl.
*H04L 12/28* (2006.01)
*H04L 12/56* (2006.01)
*H04L 29/06* (2006.01)
*H04L 29/12* (2006.01)

(52) U.S. Cl.
CPC ............ *H04L 63/0414* (2013.01); *H04L 63/20* (2013.01); *H04L 61/25* (2013.01); *H04L 61/255* (2013.01); *H04L 61/2521* (2013.01); *H04L 61/2539* (2013.01); *H04L 61/2557* (2013.01)

(58) Field of Classification Search
CPC ............ H04L 63/0414; H04L 61/2539; H04L 61/255; H04L 61/25; H04L 61/2521; H04L 61/2557; H04L 63/20
See application file for complete search history.

(56) References Cited

U.S. PATENT DOCUMENTS

| 5,734,649 A | 3/1998 | Carvey et al. |
| 6,052,064 A | 4/2000 | Budnik et al. |
| 6,055,236 A | 4/2000 | Nessett et al. |

(Continued)

FOREIGN PATENT DOCUMENTS

| CN | 1173256 | 2/1998 |
| JP | 2008177714 A | 7/2008 |
| WO | 97/13340 | 4/1997 |

OTHER PUBLICATIONS

Zhao, C., Jia, C., & Lin, K. (Oct. 2010). Technique and Application of End-Hopping in Network Defense. In Cryptography and Network Security, Data Mining and Knowledge Discovery, E-Commerce & Its Applications and Embedded Systems (CDEE), 2010 First ACIS International Symposium on (pp. 266-270). IEEE.

(Continued)

*Primary Examiner* — Robert C Scheibel
*Assistant Examiner* — Lonnie Sweet
(74) *Attorney, Agent, or Firm* — Robert J. Sacco, Esq.; Fox Rothschild LLP

(57) ABSTRACT

A switch and methods for its use are disclosed. The switch includes input and output circuitry for receiving and forwarding data packets to computing devices connected to the network. The switch also includes a memory configured to store a number of tables relating the ports to the physical addresses of computing devices connected to the switch. The switch is capable of correctly forwarding data packets which specify false identity parameters. The switch is also capable of dynamic forwarding used to forward data packets across many paths to the destination. The switch is also capable of forwarding data packets to one of a number of output ports based on a comparison of at least one of the identity parameters that specifies false information to a table stored in memory.

22 Claims, 16 Drawing Sheets

(56) References Cited

U.S. PATENT DOCUMENTS

| | | | |
|---|---|---|---|
| 6,154,839 | A | 11/2000 | Arrow et al. |
| 6,510,154 | B1 | 1/2003 | Mayes et al. |
| 6,535,511 | B1 | 3/2003 | Rao |
| 6,646,989 | B1 | 11/2003 | Khotimsky et al. |
| 6,826,684 | B1 | 11/2004 | Fink et al. |
| 6,917,974 | B1 | 7/2005 | Stytz et al. |
| 6,981,146 | B1 | 12/2005 | Sheymov |
| 7,010,604 | B1 | 3/2006 | Munger et al. |
| 7,043,633 | B1 | 5/2006 | Fink et al. |
| 7,085,267 | B2 | 8/2006 | Carey et al. |
| 7,133,930 | B2 | 11/2006 | Munger et al. |
| 7,216,359 | B2 | 5/2007 | Katz et al. |
| 7,236,598 | B2 | 6/2007 | Sheymov et al. |
| 7,382,778 | B2 | 6/2008 | Chari et al. |
| 7,469,279 | B1 | 12/2008 | Stamler et al. |
| 7,712,130 | B2 | 5/2010 | Reamer |
| 7,739,497 | B1 | 6/2010 | Fink et al. |
| 7,756,140 | B2 | 7/2010 | Matoba |
| 7,757,272 | B1 * | 7/2010 | Dean ............................... 726/2 |
| 7,787,476 | B2 | 8/2010 | Shimizu et al. |
| 7,895,348 | B2 | 2/2011 | Twitchell, Jr. |
| 7,958,556 | B2 | 6/2011 | Roesch et al. |
| 7,996,894 | B1 | 8/2011 | Chen et al. |
| 8,037,530 | B1 | 10/2011 | Fink et al. |
| 8,139,504 | B2 | 3/2012 | Mankins et al. |
| 8,199,677 | B1 | 6/2012 | Amis et al. |
| 8,464,334 | B1 | 6/2013 | Singhal |
| 8,572,717 | B2 | 10/2013 | Narayanaswamy |
| 8,769,688 | B2 | 7/2014 | Geigel |
| 8,844,036 | B2 | 9/2014 | Saidi et al. |
| 8,862,747 | B2 | 10/2014 | Shah et al. |
| 8,959,573 | B2 | 2/2015 | Smith et al. |
| 2002/0010799 | A1 | 1/2002 | Kubota et al. |
| 2002/0161884 | A1 | 10/2002 | Munger et al. |
| 2002/0161905 | A1 | 10/2002 | Haverinen et al. |
| 2003/0149783 | A1 | 8/2003 | McDaniel |
| 2004/0022194 | A1 | 2/2004 | Ricciulli |
| 2004/0103205 | A1 | 5/2004 | Larson et al. |
| 2004/0255167 | A1 | 12/2004 | Knight |
| 2005/0038708 | A1 | 2/2005 | Wu |
| 2005/0235044 | A1 | 10/2005 | Tazuma |
| 2006/0121418 | A1 | 6/2006 | DeMarco et al. |
| 2007/0058540 | A1 | 3/2007 | Kay |
| 2007/0073838 | A1 | 3/2007 | Shizuno |
| 2007/0081541 | A1 | 4/2007 | Umekage et al. |
| 2007/0133576 | A1 * | 6/2007 | Tsuge et al. .................. 370/401 |
| 2007/0261112 | A1 | 11/2007 | Todd et al. |
| 2008/0052487 | A1 * | 2/2008 | Akahane et al. .............. 711/207 |
| 2008/0056487 | A1 | 3/2008 | Akyol et al. |
| 2008/0140847 | A1 | 6/2008 | Almog |
| 2008/0159128 | A1 | 7/2008 | Shaffer et al. |
| 2008/0172739 | A1 | 7/2008 | Nakae et al. |
| 2008/0205399 | A1 | 8/2008 | Delesalle et al. |
| 2008/0222734 | A1 | 9/2008 | Redlich et al. |
| 2008/0235755 | A1 | 9/2008 | Blaisdell et al. |
| 2008/0313348 | A1 | 12/2008 | Morris et al. |
| 2009/0031042 | A1 | 1/2009 | Phatak |
| 2009/0059788 | A1 | 3/2009 | Granovsky et al. |
| 2009/0106439 | A1 | 4/2009 | Twitchell, Jr. |
| 2009/0165116 | A1 | 6/2009 | Morris |
| 2009/0285101 | A1 * | 11/2009 | Lu ................................. 370/238 |
| 2010/0009758 | A1 | 1/2010 | Twitchell, Jr. |
| 2010/0229241 | A1 | 9/2010 | Liu et al. |
| 2010/0246823 | A1 | 9/2010 | Xiao et al. |
| 2010/0274923 | A1 | 10/2010 | Dean |
| 2010/0322391 | A1 | 12/2010 | Michaelis et al. |
| 2010/0333188 | A1 | 12/2010 | Politowicz |
| 2011/0016210 | A1 | 1/2011 | Underwood |
| 2011/0179136 | A1 | 7/2011 | Twitchell, Jr. |
| 2011/0277032 | A1 | 11/2011 | Vargas |
| 2012/0117376 | A1 | 5/2012 | Fink et al. |
| 2012/0201138 | A1 | 8/2012 | Yu et al. |
| 2012/0303616 | A1 | 11/2012 | Abuelsaad et al. |
| 2013/0104228 | A1 | 4/2013 | Burnham et al. |
| 2013/0298221 | A1 | 11/2013 | Smith et al. |
| 2013/0298236 | A1 | 11/2013 | Smith et al. |

OTHER PUBLICATIONS

Repik, K.A. "Defeating Adversary Network Intelligence Efforts With Active Cyber Defense Techniques", Degree of Master of Cyber Warfare, Jun. 1, 2008, XP55004366, Retrieved from the Internet: URL:<http://www.dtic.mil/cgi-bin/GetTRDoc?A> D=ADA488411 &Location=U2&doc=GetTRDoc.pdf [retrieved on Aug. 9, 2011].

International Search Report mailed Mar. 3, 2014, Application Serial No. PCT/SUS2013/038557 in the name of Harris Corporation.

Michalski, John., et al., "Final Report for the Network Security Mechanisms Utilizing Network Address Translation LDRD Project (SAND2002-3613)" (Nov. 2002) Retrieved from the Internet: URL:http://prod.sandia.gov/techlib/access-control.cgi/2002/023613.pdf [retrieved on Apr. 19, 2013].

International Search Report mailed Apr. 29, 2013, Application Serial No. PCT/US2013/023702 in the name of Harris Corporation.

Atighetchi, M., et al, "Adaptive Use of Network-Centric Mechanism in Cyber-Defense", Proc. 6th IEEE International Symp. Object-Oriented Real-Time Distributed Computing, IEEE CS Press, 2003, p. 183-192.

Masking Networks, Inc. "MS-200 Network Masking Capabilities", Jun. 2010.

Information about Related Patents and Patent Applications, see section 6 of the accompanying Information Disclosure Statement Letter, which concerns Related Patents and Patent Applications, Jul. 2009.

Shi, L., et al., "Full Service Hopping for Proactive Cyber-Defense", International Conference on Networking, Sensing and Control, 2008. ICNSC 2008, IEEE, Apr. 6-8, 2008.

Kewley, D., et al., "Dynamic Approaches to Thwart Adversary Intelligence Gathering," pp. 176-185, 0-7695-1212-7/01 2001 IEEE.

Beraud, P., et al., "Cyber Defense Network Maneuver Commander", 978-1-4244-7402-8/10 2010 IEEE.

Levin, D., "Lessons Learned in Using Live Red Teams in IA Experiments", Retrieved from the Internet <URL:http://www.bbn.com/resources/pdf/RedTeamExptsPaper-Levin10-02.pdf>>, [retrieved on Apr. 9, 2012].

Search Report for Taiwan Patent Application No. 102115550 dated Oct. 20, 2014.

International Preliminary Report on the Patentability mailed Nov. 13, 2014, Application Serial No. PCT/US2013/037883 in the name of Harris Corporation.

International Preliminary Report on the Patentability mailed Nov. 13, 2014 Application Serial No. PCT/US2013/037888 in the name of Harris Corporation.

International Preliminary Report on the Patentability mailed Nov. 13, 2014 Application Serial No. PCT/US2013/037894 in the name of Harris Corporation.

International Preliminary Report on the Patentability mailed Nov. 13, 2014 Application Serial No. PCT/US2013/037976 in the name of Harris Corporation.

International Preliminary Report on the Patentability mailed Nov. 13, 2014 Application Serial No. PCT/US2013/038557 in the name of Harris Corporation.

International Preliminary Report on the Patentability mailed Nov. 13, 2014 Application Serial No. PCT/US2013/038558 in the name of Harris Corporation.

International Preliminary Report on the Patentability mailed Nov. 13, 2014 Application Serial No. PCT/US2013/038600 in the name of Harris Corporation.

Jian, et al., "A Novel Scheme for Protecting Receiver's Location Privacy in Wireless Sensor Networks," IEEE Transactions on Wireless Communications, vol. 7, No. 10, Oct. 2008, pp. 3769-3779.

Boukerche et al., "Secure time synchronization protocols for wireless sensor networks," Wireless Communications, IEEE, 2007, vol. 14.5, pp. 64-69.

(56) References Cited

OTHER PUBLICATIONS

Wu et al., "CAR: Securing PCM Main Memory System with Cache Address Remapping," Parallel and Distributed Systems (ICPADS), 2012 IEEE 18th International Conference, Dec. 2012, pp. 628-635.

Ganeriwal et al., Secure time synchronization service for sensor networks, 2010, ACM Digital Library, pp. 97-106.

Rajasegarar et al., Anomaly detection in wireless sensor networks, 2008, IEEE, vol. 15, Issue 4, pp. 34-40.

* cited by examiner

| Identity Parameter | Description | Technique |
|---|---|---|
| IP Address | 32 bit number, Class C 254 Addresses | IP Header Manipulation Packet Data Manipulation |
| MAC Address | 6 Bytes - 281,474,976,710,656 Addresses First 3 Bytes - (OUI), Last 3 Bytes – NIC Specific | Ethernet Header Manipulation |
| Net/Subnet | Class A, B, or C Addresses | Cross Stream Fragmentation |
| TCP Sequence # | Make TCP Sequence numbers random. | TCP Header Manipulation |
| Port | 1 - 65,535 (ex. 2957) | TCP Header Manipulation |

FIG. 16

SWITCH FOR COMMUNICATING DATA IN A DYNAMIC COMPUTER NETWORK

BACKGROUND OF THE INVENTION

1. Statement of the Technical Field

The inventive arrangements relate to computer network security, and more particularly to systems for communicating between two or more logical subdivisions of a computer network where the network is dynamically maneuverable to defend against malicious attacks.

2. Description of the Related Art

The central weakness of current cyber infrastructure is its static nature. Assets receive permanent or infrequently-changing identifications, allowing adversaries nearly unlimited time to probe networks, map and exploit vulnerabilities. Additionally, data traveling between these fixed entities can be captured and attributed. The current approach to cyber security places technologies such as firewalls and intrusion detection systems around fixed assets, and uses encryption to protect data en route. However, this traditional approach is fundamentally flawed because it provides a fixed target for attackers. In today's globally connected communications infrastructure, static networks are vulnerable networks.

The Defense Advanced Research Projects Agency (DARPA) Information Assurance (IA) Program has performed initial research in the area of dynamic network defense. A technique was developed under the Information Assurance Program to dynamically reassign Internet protocol (IP) address space feeding into a pre-designated network enclave for the purpose of confusing any would-be adversaries observing the network. This technique is called dynamic network address transformation (DYNAT). An overview of the DYNAT technology was presented in a published paper by DARPA entitled Dynamic Approaches to Thwart Adversary Intelligence (2001).

SUMMARY OF THE INVENTION

A method for using the switch while connected to a plurality of devices to a dynamic computer network is described. The method includes receiving a data communication which includes a plurality of identity parameters associated with a source computing device and a destination computing device. A first set of said plurality of identity parameters are pseudo-randomly modified to specify false information based on a pseudorandom function and a seed value specified in a first mission plan. The method also includes selecting a path for the data communication using one of the false identity parameters of the first set. The path is selected by referencing a table relating the ports of the switch to a number of physical addresses to determine an output port that corresponds to a physical address of the destination of the data communication. The method further includes forwarding the data communication to the output port corresponding to the path.

Also described is a switch for forwarding data in a dynamic computer network is described. The switch includes a number of ports configured to receive and transmit data packets which include a plurality of identity parameters. The switch further includes a memory for storing a mission plan that specifies a pseudorandom function and a seed value and at least one table, populated based on the mission plan, relating said plurality of ports with a plurality of physical addresses of devices connected to said switch.

The switch also includes one or more processing units that processes information in order to identify a received data packet as one of dynamic and static. A dynamic data packet is one that includes a first set of said identity parameters that have been modified to specify false identity parameters based on the mission plan. A static data packet is one that includes identity parameters that exclusively specify true identity parameters. The processing unit also selects an output port to forward said data packet through using a false identity parameter of the first set by referencing the table stored in memory. The processing unit also forwards said data packet through said output port.

BRIEF DESCRIPTION OF THE DRAWINGS

Embodiments will be described with reference to the following drawing figures, in which like numerals represent like items throughout the figures, and in which:

FIG. 16 is a table that is useful for understanding some of the types of identity parameters that can be modified.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "dynamic" refers to a network, a component of a network, and/or a network apparatus that is enabled to operate in accordance with Moving Target Technology as described in further detail below. Similarly, the term "static" refers to a network, a component of a network, and/or a network apparatus that is not enabled to operate in accordance with Moving Target Technology.

Identity Agile Computer Network

Figure 1:
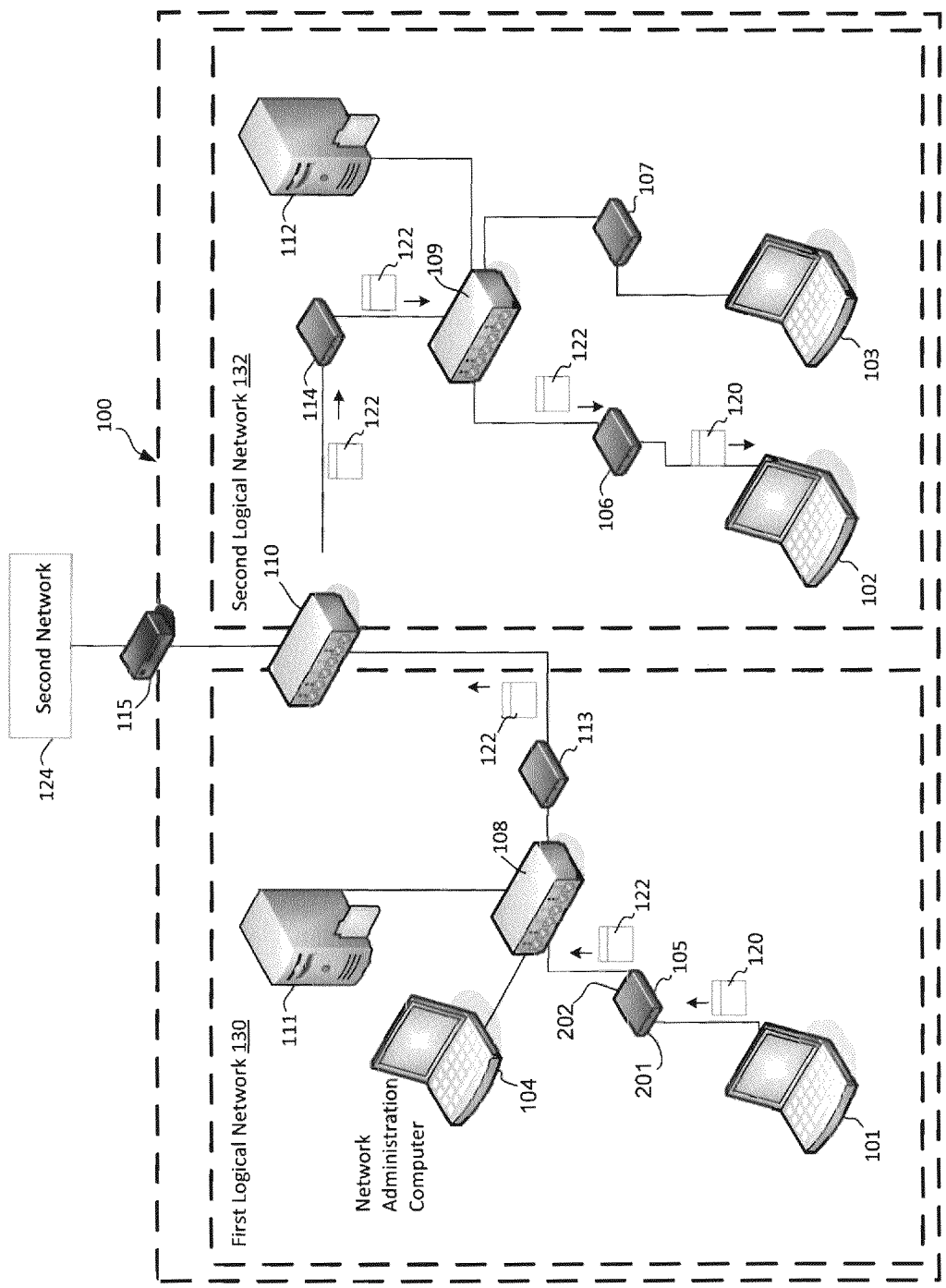
FIG. 1 is an example of a computer network that is useful for understanding the present invention.

Referring now to FIG. 1, there is shown a diagram of an exemplary network 100 which includes a plurality of computing devices. The computing devices can include client computers 101-103, network administration computer (NAC) 104, servers 111, 112, network layer 2 switches 108, 109, layer 3 switch 110, and a bridge 115. The client computers can be any type of computing device which might require network services, such as a conventional tablet, notebook, laptop or desktop computer. The layer 3 switch 110 can be a conventional routing device that routes data packets between computer networks. The hubs 108, 109 are conventional hub devices (e.g. an Ethernet hub) as are well known in the art. Servers 111, 112 can provide various computing services utilized by client computers 101-103. For example, the servers 111, 112 can be file servers which provide a location for shared storage of computer files used by client computers 101-103.

The communication media for the network 100 can be wired, wireless or both, but shall be described herein as a wired network for simplicity and to avoid obscuring the invention. The network will communicate data using a communication protocol. As is well known in the art, the communication protocol defines the formats and rules used for communicating data throughout the network. The network in FIG. 1 can use any communication protocol or combination of protocols which is now known or known in the future. For example, the network can use the well known Ethernet protocol suite for such communications. Alternatively, the network can make use of other protocols, such as the Internet Protocol Suite (often referred to as TCP/IP), SONET/SDH, or Asynchronous Transfer Mode (ATM) communication protocols. In some embodiments, one or more of these communication protocols can be used in combination. Although one network topology is shown in FIG. 1, the invention is not limited in this regard. Instead, any type of suitable network topology can be used, such as a bus network, a star network, a ring network or a mesh network.

The invention generally concerns a method for communicating data in a computer network (e.g., in computer network 100), where data is communicated from a first computing device to a second computing device. Computing devices within the network are represented with multiple identity parameters. The phrase "identity parameters" as used herein can include items such as an internet protocol (IP) address, media access control (MAC) address, ports and so on. However, the invention is not limited in this regard, and identity parameters can also include a variety of other information which is useful for characterizing a network node. The various types of identity parameters contemplated herein are discussed below in further detail. The inventive arrangement involve the use of moving target technology (MTT) to manipulate one or more of such identity parameters for one or more computing devices within the network. This technique disguises communication patterns and network addresses of such computing devices. The manipulation of identity parameters as described herein is generally performed in conjunction with data communications in the network, i.e. when data is to be communicated from a first computer in the network (e.g. client computer 101) to a second computer in the network (e.g., client computer 102). Accordingly, identity parameters that are manipulated can include those of a source computing device (the device from which the data originated) and the destination computing device (the device to which the data is being sent). The set of identity parameter that are communicated is referred to herein as an identity parameter set (IDP set). This concept is illustrated in FIG. 1, which shows that an IDP set 120 is transmitted by client computer 101 as part of a data packet (not shown).

The process according to the inventive arrangements involves selectively modifying at a first location within the computer network, values contained in a data packet or datagram which specify one or more identify parameters of a source and/or destination computing device. The identity parameters are modified in accordance with a mission plan. The location where such modification is performed will generally coincide with the location of one of the modules 105-107, 113, 114. Referring once again to FIG. 1, it can be observed that modules 105, 106, 107, 113, 114 are interposed in the network between the various computing devices which comprise nodes in such network. In these locations, the modules intercept data packet communications, perform the necessary manipulations of identity parameters, and retransmit the data packets along a transmission path. In alternative embodiments, the modules 105, 106, 107, 113, 114 can perform a similar function, but can be integrated directly into one or more of the computing devices. For example, the modules could be integrated into client computers 101, 102, 103, servers 111, 112, layer 2 switches 108, 109 and/or within layer 3 switch 110.

Additionally, network 100 can be divided into a number of logical subdivisions, sometimes referred to as sub-networks or subnets, connected through layer 3 switch 110. An enterprise network can be divided into a number of subnets for a variety of administrative or technical reasons including, but not limited to, hiding the topology of the network from being visible to external hosts, connecting networks utilizing different network protocols, separately administering network addressing schemes on the subnet level, enabling management of data traffic across subnets due to constrained data connections, and the like. Subnetting is well known in the art and will not be described in further detail.

Referring again to FIG. 1, network 100 is divided into two logical networks, a first logical network 130 and a second logical network 132. The phrase "logical network" as used herein refers to any logical subdivision of a computer network. In an embodiment, logical networks 130, 132 are connected through layer 3 switch 110. Layer 3 switch 110 is responsible for directing traffic between the logical networks, i.e. from client computer 101 to client computer 103. Layer 3 switch 110 is also responsible for directing traffic from any host connected to network 100 bound for second network 124. In the embodiment shown in FIG. 1, traffic routed from network 100 to second network 124 passes through bridge 115. As with the modules above, the functionality of the bridge 115 could be integrated within layer 3 switch 110.

Figure 2:
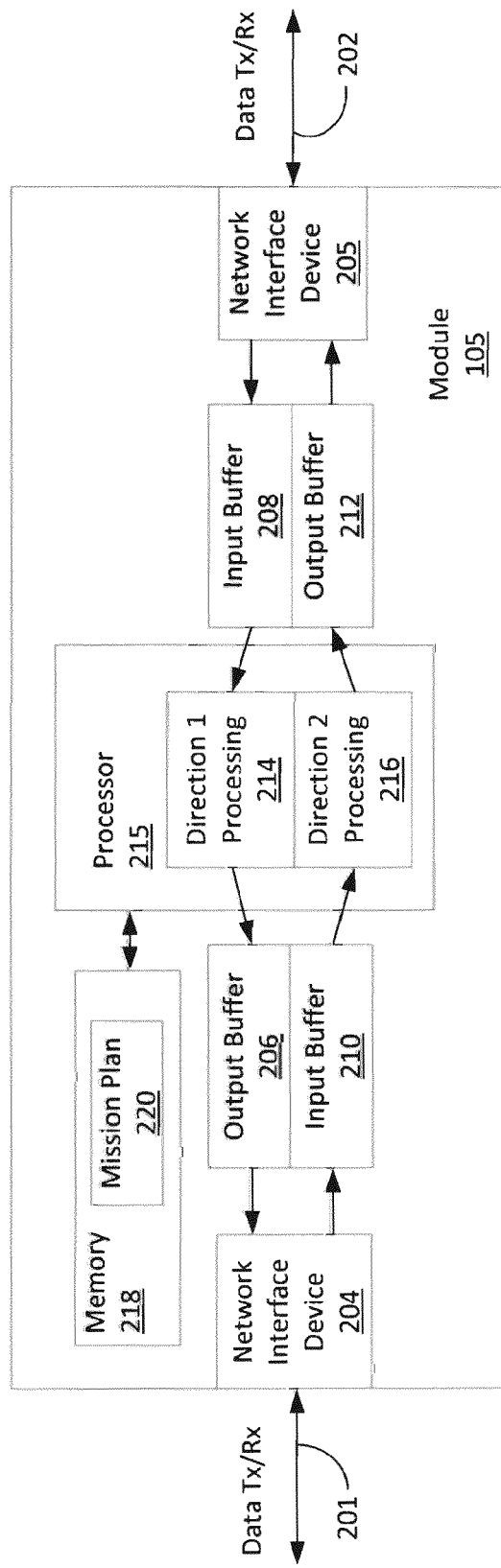
FIG. 2 is an example of a module that can be used in the present invention for performing certain manipulations of identity parameters.

A example of a functional block diagram of a module 105 is shown in FIG. 2. Modules 106-107, 113, 114 can have a similar functional block diagram, but it should be understood that the invention is not limited in this regard. As shown in FIG. 2, the module 105 has at least two data ports 201, 202, each of which can correspond to a respective network interface device 204, 205. Data received at port 201 is processed at network interface device 204 and temporarily stored at an input buffer 210. The processor 215 accesses the input data packets contained in input buffer 210 and performs any necessary manipulation of identity parameters as described herein. The modified data packets are passed to output buffer 212 and subsequently transmitted from port 202 using network interface device 205. Similarly, data received at port 202 is processed at network interface device 205 and temporarily stored at an input buffer 208. The processor 215 accesses the input data packets contained in input buffer 208 and performs any necessary manipulation of identity parameters as described herein. The modified data packets are passed to output buffer 206 and subsequently transmitted from port 201 using network interface device 204. In each module, manipulation of identity parameters is performed by processor 215 in accordance with a mission plan 220 stored in a memory 218.

It will be understood from FIG. 2 that a module is preferably configured so that it operates bi-directionally. In such embodiments, the module can implement different modification functions, depending on a source of a particular data packet. The dynamic modification function in each module can be specified in the mission plan in accordance with a source computing device of a particular data packet. Modules can determine a source of data packets by any suitable means. For example, a source address of a data packet can be used for this purpose.

At a selected module within the network 100, processor 215 will determine one or more false identity parameter values that are to be used in place of the true identity parameter values. The processor will transform one or more true identity parameter values to one or more false identity parameter values which are preferably specified by a pseudorandom function. Following this transformation, the module will forward the modified packet or datagram to the next node of the network along a transmission path. At subsequent points in the communication path, an adversary who is monitoring such network communications will observe false or incorrect information about the identity of computing devices communicating on the network.

In a preferred embodiment, the false identity parameters that are specified by the pseudorandom function are varied in accordance with the occurrence of one or more trigger events. The trigger event causes the processor 215 to use the pseudorandom function to generate a new set of false identity parameter values into which the true identity parameters are transformed. Accordingly, the trigger event serves as a basis for the dynamic variation of the false identity parameters described herein. Trigger events are discussed in more detail below. However it should be noted that trigger events for selecting a new set of false values for identity parameters can be based on the passage of time and/or the occurrence of certain network events. Trigger events can also be initiated by a user command.

The transformation of identity parameters described above provides one way to maneuver a computer network 100 for purposes of thwarting a cyber attack. In a preferred embodiment, the mission plan 220 implemented by processor 215 will also control certain other aspects of the manner in which computer network can maneuver. For example, the mission plan can specify that a dynamic selection of identity parameters are manipulated. The dynamic selection can include a choice of which identity parameters are selected for modification, and/or a number of such identity parameters that are selected. This variable selection process provides an added dimension of uncertainty or variation which can be used to further thwart an adversary's effort to infiltrate or learn about a computer network 100. As an example of this technique, consider that during a first time period, a module can modify a destination IP address and a destination MAC address of each data packet. During a second time period the module could manipulate the source IP address and a source host name in each data packet. During a third period of time the module could manipulate a source port number and a source user name. Changes in the selection of identity parameters can occur synchronously (all selected identity parameters are changed at the same time). Alternatively, changes in the selection of identity parameters can occur asynchronously (the group of selected identity parameters changes incrementally as individual identity parameters are added or removed from the group of selected identity parameters).

A pseudorandom function is preferably used for determining the selection of identity values that are to be manipulated or transformed into false values. In other words, the module will transform only the identity parameters selected by the pseudo-random function. In a preferred embodiment, the selection of identity parameters that are specified by the pseudorandom function is varied in accordance with the occurrence of a trigger event. The trigger event causes processor 215 use a pseudorandom function to generate a new selection of identity parameters which are to be transformed into false identity parameters. Accordingly, the trigger event serves as a basis for the dynamic variation of the selection of identity parameters described herein. Notably, the values of the identity parameters can also be varied in accordance with pseudorandom algorithm.

The modules are advantageously capable of also providing a third method of maneuvering the computer network for purposes of thwarting a cyber attack. Specifically, the mission plan loaded in each module can dynamically vary the location within the network where the modification or transformation of the identity parameters takes place. Consider that modification of identity parameters in an IDP set 120 sent from client computer 101 to client computer 102, could occur in module 105. This condition is shown in FIG. 1, where the identity parameters contained in IDP set 120 are manipulated in module 105 so that IDP set 120 is transformed to a new or modified IDP set 122. At least some of the identity parameters in IDP set 122 are different as compared to the identity parameters in IDP set 120. But the location where such transformation occurs is preferably also controlled by the mission plan. Accordingly, manipulation of IDP set 120 could, for example, sometimes occur at module 113 or 114, instead of at module 105. This ability to selectively vary the location where manipulation of identity parameters occurs adds a further important dimension to the maneuvering capability of the computer network.

The dynamic variation in the location where identity parameters are modified is facilitated by selectively controlling an operating state of each module. To that end, the operational states of each module preferably includes (1) an active state in which data is processed in accordance with a current mission plan, and (2) a by-pass state in which packets can flow through the module as if the module was not present. The location where the dynamic modification is performed is controlled by selectively causing certain modules to be in an active state and certain modules to be in a standby state. The location can be dynamically changed by dynamically varying the current state of the modules in a coordinated manner.

The mission plan can include predefined sequence for determining the locations within the computer network 100 where identity parameters are to be manipulated. Locations where identity parameters are to be manipulated will change in accordance with the sequence at times indicated by a trigger event. For example, the trigger event can cause a transition to a new location for manipulation or transformation of identity parameters as described herein. Accordingly, the trigger event serves as a basis for the occurrence of a change in the location where identity parameters are modified, and the predefined sequence determines where the new location will be.

From the foregoing, it will be appreciated that a data packet is modified at a module to include false identity parameters. At some point within the computer network, it is necessary to restore the identity parameters to their true values, so that the identity parameters can be used to properly perform their intended function in accordance with the particular network protocol. Accordingly, the inventive arrangements also includes dynamically modifying, at a second location (i.e., a second module), the assigned values for the identity parameters in accordance with the mission plan. The modification at the second location essentially comprises an inverse of a process used at the first location to modify the identity parameters. The module at the second location can thus restore or transform the false value identity parameters back to their true values. In order to accomplish this action, the module at the second location must be able to determine at least (1) a selection of identity parameter value that are to be transformed, and (2) a correct transformation of the selected identity parameters from false values to true values. In effect, this process involves an inverse of the pseudorandom process or processes used to determine the identity parameter selection and the changes effected to such identity parameter values. The inverse transformation step is illustrated in FIG. 1, where the IDP set 122 is received at module 106, and the identity parameter values in IDP set 122 are transformed or manipulated back to their original or true values. In this scenario, module 106 converts the identity parameters values back to those of IDP set 120.

Notably, a module must have some way of determining the proper transformation or manipulation to apply to each data communication it receives. In a preferred embodiment, this determination is performed by examining at least a source address identity parameter contained within the received data communication. For example, the source address identity parameter can include an IP address of a source computing device. Once the true identity of the source computing device is known, the module consults the mission plan (or information derived from the mission plan) to determine what actions it needs to take. For example, these actions could include converting certain true identity parameter values to false identity parameter values. Alternatively, these changes could include converting false identity parameter values back to true identity parameter values.

Notably, there will be instances where the source address identity parameter information contained in a received data communication has been changed to a false value. In those circumstances, the module receiving the data communication will not immediately be able to determine the identity of the source of the data communication. However, the module which received the communication can in such instances still identify the source computing device. This is accomplished at the receiving module by comparing the false source address identity parameter value to a look-up-table (LUT) which lists all such false source address identity parameter values in use during a particular time. The LUT also includes a list of true source address identity parameter values that correspond to the false source address values. The LUT can be provided directly by the mission plan or can be generated by information contained within the mission plan. In either case, the identification of a true source address identity parameter value can be easily determined from the LUT. Once the true source address identity parameter has been determined, then the module which received the data communication can use this information to determine (based on the mission plan) what manipulations to the identity parameters are needed.

Notably, the mission plan can also specify a variation in the second location where identity parameters are restored to their true values. For example, assume that the identity parameters are dynamically modified at a first location comprising module 105. The mission plan can specify that the restoration of the identity parameters to their true values occurs at module 106 as described, but can alternatively specify that dynamic modification occur instead at module 113 or 114. In some embodiments, the location where such manipulations occur is dynamically determined by the mission plan in accordance with a predefined sequence. The predefined sequence can determine the sequence of locations or modules where the manipulation of identity parameters will occur.

The transition involving dynamic modification at different locations preferably occurs in accordance with a trigger event. Accordingly, the predefined sequence determines the pattern or sequence of locations where data manipulations will occur, and the trigger event serves as a basis for causing the transition from one location to the next. Trigger events are discussed in more detail below; however, it should be noted that trigger events can be based on the passage of time, user control, and/or the occurrence of certain network events. Control over the choice of a second location (i.e., where identity parameters are returned to their true values) can be effected in the same manner as described above with regard to the first location. Specifically, operating states of two or more modules can be toggled between an active state and a bypass state. Manipulation of identity parameters will only occur in the module which has an active operating state. The module with a bypass operating state will simply pass data packets without modification.

Alternative methods can also be used for controlling the location where manipulation of identity parameters will occur. For example, a network administrator can define in a mission plan several possible modules where a identity parameters can be converted from true values to false values. Upon the occurrence of a trigger event, a new location can be selected from among the several modules by using a pseudorandom function, and using a trigger time as a seed value for the pseudorandom function. If each module implements the same pseudorandom function using the same initial seed values then each module will calculate the same pseudorandom value. The trigger time can be determined based on a clock time, such as a GPS time or system clock time). In this way, each module can independently determine whether it is currently an active location where manipulation of identity parameters should occur. Similarly, the network administrator can define in a mission plan several possible modules where dynamic manipulation returns the identity parameters to their correct or true values. The selection of which module is used for this purpose can also be determined in accordance with a trigger time and a pseudorandom function as described herein. Other methods are also possible for determining the location or module where identity parameter manipulations are to occur. Accordingly, the invention is not intended to be limited to the particular methods described herein.

Notably, varying the position of the first and/or second locations where identity functions are manipulated will often result in varying a physical distance between the first and second location along a network communication path. The distance between the first and second locations is referred to herein as a distance vector. The distance vector can be an actual physical distance along a communication path between the first and second location. However, it is useful to think of the distance vector as representing the number of network nodes that are present in a communication path between the first and second locations. It will be appreciated that dynamically choosing different position for the first and second locations within the network can have the effect of changing the number of nodes between the first and second locations. For example, in FIG. 1 the dynamic modification of identity parameters are implemented in selected ones of the modules 105, 106, 107, 113, 114. The modules actually used to respectively implement the dynamic modification is determined as previously described. If module 105 is used for converting identity parameters to false values and module 106 is used to convert them back to true values, then there are three network nodes (108, 110, 109) between modules 105 and 106. But if module 113 is used to convert to false values and module 114 is used to convert the identity parameters back to true values, then there is only one network node (110) between modules 113 and 114. Accordingly, it will be appreciated that dynamically changing the position of locations where dynamic modification occurs can dynamically vary the distance vector. This variation of the distance vector provides an added dimension of variability to network maneuvering or modification as described herein.

In the present invention, the manipulation of identity parameter values, the selection of identity parameters, and the locations where these identity parameters is each defined as a maneuvering parameter. Whenever a change occurs in one of these three maneuvering parameters, it can be said that a network maneuver has occurred. Any time one of these three maneuvering parameters is changed, we can say that a network maneuver has occurred. In order to most effectively thwart an adversary's efforts to infiltrate a computer network 100, network maneuvering is preferably controlled by means of a pseudorandom process as previously described. Those skilled in the art will appreciate that a chaotic process can also be used for performing this function. Chaotic processes are technically different as compared to pseudorandom functions, but for purposes of the present invention, either can be used, and the two are considered equivalent. In some embodiments, the same pseudorandom process can be used for dynamically varying two or more of the maneuvering parameters. However, in a preferred embodiment of the invention, two or more different pseudorandom processes are used so that two or more of these maneuvering parameters are modified independently of the others.

Trigger Events

As noted above, the dynamic changes to each of the maneuvering parameters is controlled by at least one trigger. A trigger is an event that causes a change to occur in relation to the dynamic modifications described herein. Stated differently, it can be said that the trigger causes the network to maneuver in a new way that is different than at a previous time (i.e., before the occurrence of the trigger). For example, during a first period of time, a mission plan can cause an IP address can be changed from value A to value B; but after the trigger event, the IP address can instead be changed from value A to value C. Similarly, during a first period of time a mission plan can cause an IP and MAC address to be modified; but after the trigger event, the mission plan can instead cause a MAC address and user name to be modified. As a third example, consider that during a first period of time a mission plan may cause identity parameters to be changed when an IDP set 120 arrives at module 105; but after the trigger event, can cause the identity parameters to instead be changed when and IDP set 120 arrives at module 113.

In its simplest form a trigger can be user activated or based on a simple timing scheme. In such an embodiment, a clock time in each module could serve as a trigger. For example, a trigger event could be defined as occurring at the expiration of every 60 second time interval. For such an arrangement, one or more of the maneuvering parameters could change every 60 seconds in accordance with a predetermined clock time. In some embodiments, all of the maneuvering parameters can change concurrently so that the changes are synchronized. In a slightly more complex embodiment, a time-based trigger arrangement can also be used, but a different unique trigger time interval can be selected for each maneuvering parameter. Thus, false identity parameter values could be changed at time interval X, a selection of identity parameters would change in accordance with a time interval Y, and a location where such changes are performed would occur at time interval Z, where X, Y and Z are different values.

It will be appreciated that in embodiments of the invention which rely upon clock time as a trigger mechanism, it is advantageous to provide synchronization as between the clocks in various modules 105, 106, 107, 113, 114 to ensure that packets are not lost or dropped due to unrecognized identity parameters. Synchronization methods are well known and any suitable synchronization mechanism can be used for this purpose. For example, the modules could be synchronized by using a highly accurate time reference such as a GPS clock time. Alternatively, a unique wireless synchronization signal could be broadcast to each of the modules from a central control facility.

Other types of triggers are also possible with the present invention. For example, trigger events can be based on the occurrence or detection of potential network security threats. According to an embodiment of the invention, a potential network security threat can be identified by a network security software suite. Alternatively, the potential network security threat can be identified upon the receipt of a data packet at a module 105, 106, 107, 113, 114 where the packet contains one or more identity parameters that are inconsistent with the present state of network maneuvering. Regardless of the basis for identifying a network security threat, the existence of such threat can serve as a trigger event. A trigger event based on a network security threat can cause the same types of network maneuvers as those caused by the time based triggers described above. For example, false identity parameters, the selection of identity parameters and the locations of identity parameter transformations could remain stable (i.e., unchanged) except in the case were a network security threat was detected. Such an arrangement might be chosen, for example, in computer networks where frequent network maneuvering is not desirable.

Alternatively, time based trigger events can be combined with trigger events based on potential threats to network security. In such embodiments, a trigger event based on a security threat can have a different effect on the network maneuvering as compared to time based triggers. For example, a security threat-based trigger event can cause strategic or defensive changes in the network maneuvering so as to more aggressively counter such network security threat. The precise nature of such measures can depend on the nature of the threat, but can include a variety of responses. For example, different pseudorandom algorithms can be selected, and/or the number of identity parameters selected for manipulation in each IDP set 120 can be increased. In systems that already make use of time based triggers, the response can also include increasing a frequency of network maneuvering. Thus, more frequent changes can be made with respect to (1) the false identity parameter values, (2) the selection of identity parameters to be changed in each IDP set, and/or (3) the position of the first and second locations where identity parameters are changed. Accordingly, the network maneuvering described herein provides a method for identifying potential network security threats and responding to same.

Mission Plans

According to a preferred embodiment of the invention, the network maneuvering described herein is controlled in accordance with a mission plan. A mission plan is a schema that defines and controls maneuverability within the context of a network and a security model. As such, the mission plan can be represented as a data file that is communicated from the network administration computer (NAC) 104 to each module 105-107, 113-114. The mission plan is thereafter used by each module to control the manipulation of identity parameters and coordinate its activities with the actions of the other modules in the network.

According to a preferred embodiment, the mission plan can be modified from time to time by a network administrator to update or change the way in which the network maneuvers to thwart potential adversaries. As such, the mission plan provides a network administrator with a tool that facilitates complete control over the time, place and manner in which network maneuvering will occur within the network. Such update ability allows the network administrator to tailor the behavior of the computer network to the current operating conditions and more effectively thwart adversary efforts to infiltrate the network. Multiple mission plans can be defined by a user and stored so that they are accessible to modules within the network. For example, the multiple mission plans can be stored at NAC 104 and communicated to modules as needed. Alternatively, a plurality of mission plans can be stored on each module and can be activated as necessary or desirable to maintain security of the network. For example, if the network administrator determines or suspects that an adversary has discovered a current mission plan for a network, the administrator may wish to change the mission plan. Effective security procedures can also dictate that the mission plan be periodically changed.

Figure 3:
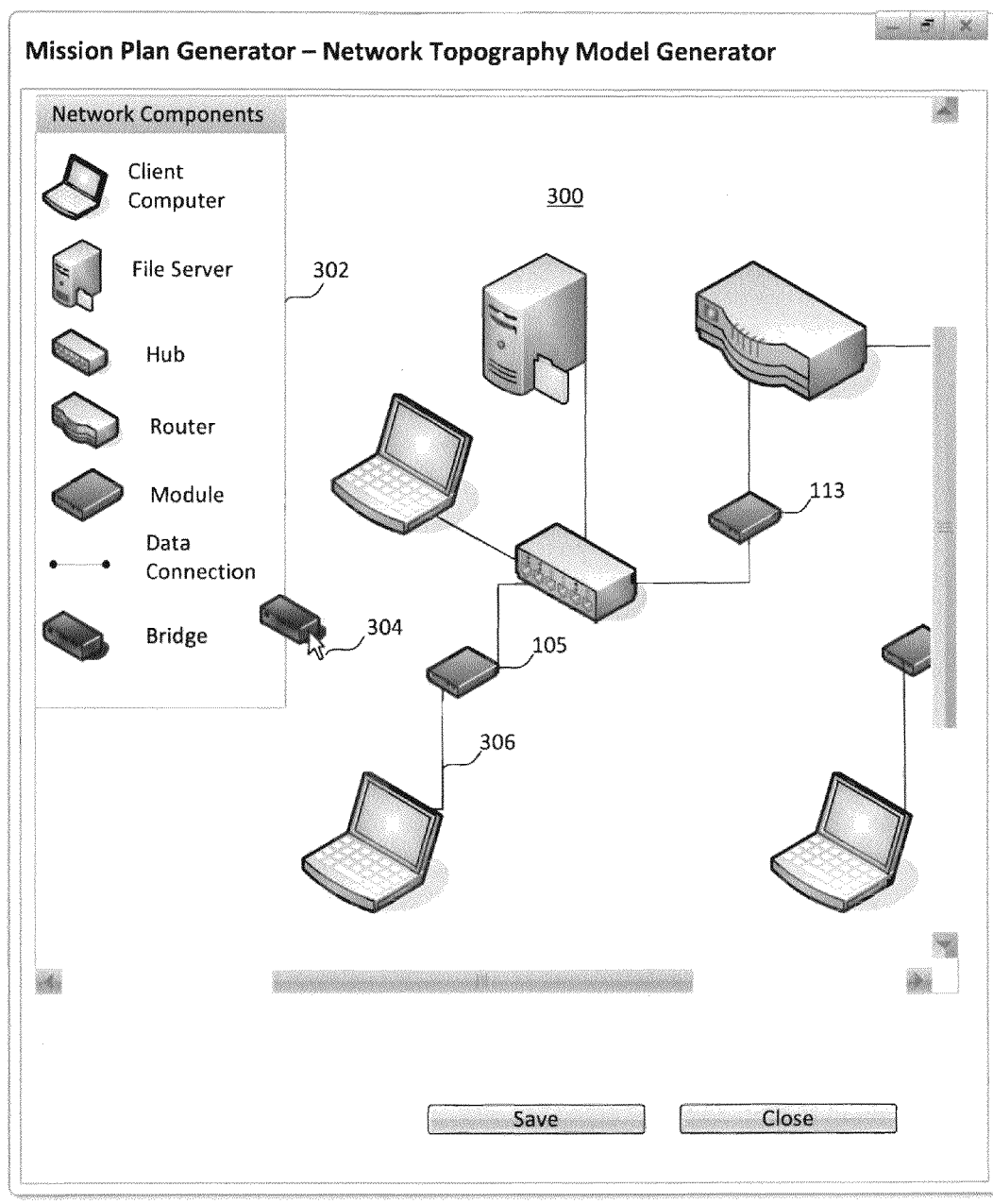
FIG. 3 is a drawing that is useful for understanding a tool that can be used to help characterize the network in FIG. 1.

The process of creating a mission plan can begin by modeling the network 100. The creation of the model is facilitated by a network control software application (NCSA) executing on a computer or server at the network command center. For example, in the embodiment shown in FIG. 1, the NCSA can execute on NAC 104. The network model preferably includes information which defines data connections and/or relationships between various computing devices included in the network 100. The NCSA will provide a suitable interface which facilitates entry of such relationship data. According to one embodiment, the NCSA can facilitate entry of data into tables which can be used to define the mission plan. However, in a preferred embodiment, a graphic user interface is used to facilitate this process. Referring now to FIG. 3, the NCSA can include a network topography model generator tool. The tool is used to assist the network administrator in defining the relationship between each of the various components of the networks. The network topography tool provides a workspace 300 in which an administrator can drag and drop network components 302, by using a cursor 304. The network administrator can also create data connections 306 between various network components 302. As part of this modeling process, the network administrator can provide network address information for the various network components, including the modules 105-107, 113, 114.

Figure 4:
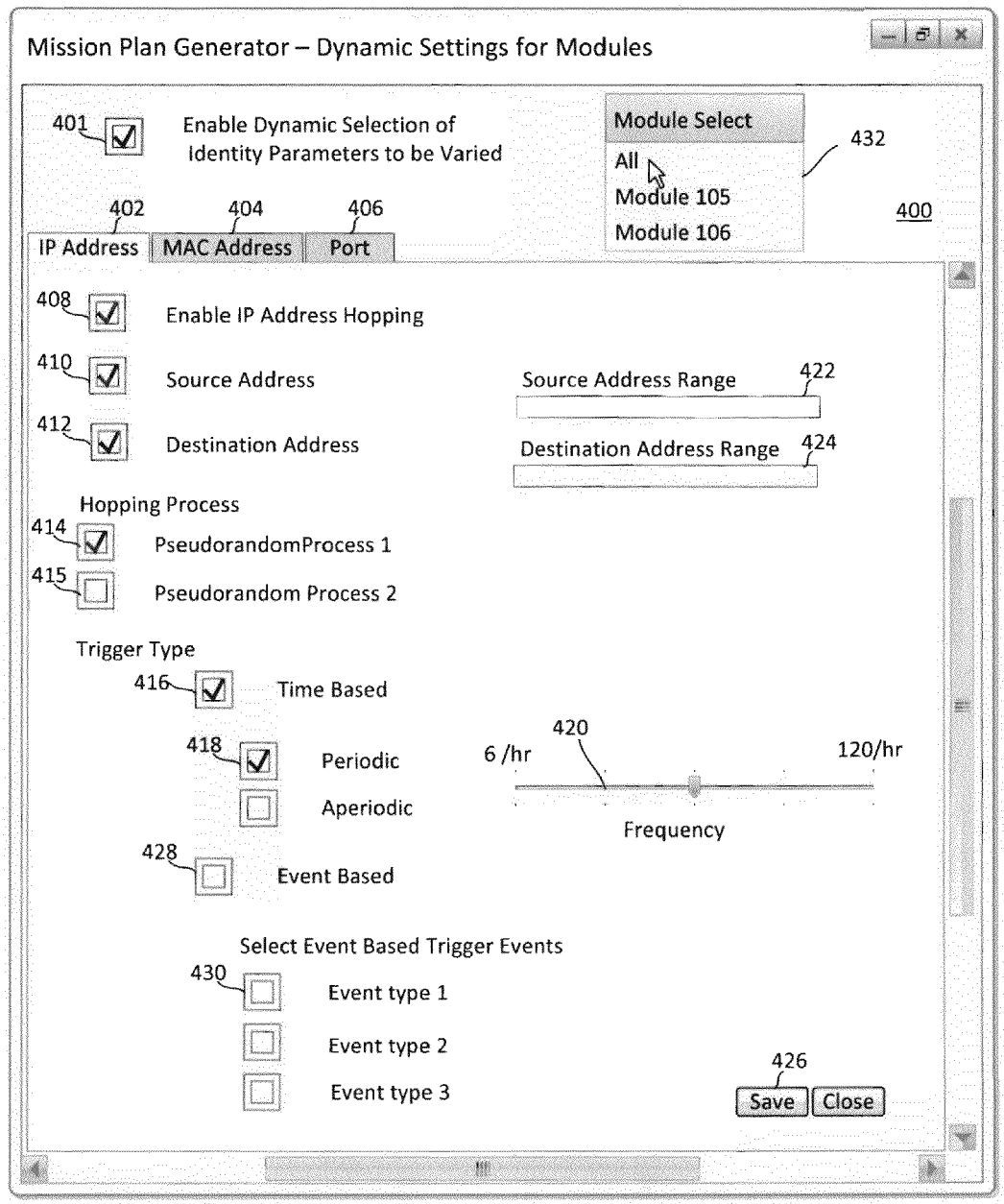
FIG. 4, is an example of a dialog box of a graphical user interface that can be used to select dynamic settings for modules in FIG. 1.

Once the network has been modeled, it can be saved and used by the network administrator to define the manner in which the various modules 105-107, 113, 114 behave and interact with one another. Referring now to FIG. 4, the NCSA can generate a dialog box 400 of which can be used to further develop a mission plan. A drop-down menu 432 can be used to select the particular module (e.g. module 105) to which the settings in dialog box 400 are to be applied. Alternatively, the network administrator can use drop-down menu 432 to indicate that the settings in dialog box 400 are intended to be applied to all modules within the network (e.g., by selecting "All" in menu 432). The process can continue by specifying whether a fixed set of identity parameters will always be modified in each of the modules, or whether the set of identity parameters that are manipulated shall be dynamically varied. If the selection or set of identity parameters that are to be manipulated in the modules is intended to be dynamically varied, the network administrator can mark check-box 401 to indicate that preference. If the check-box 401 is not marked, that will indicate that the set of identity parameters to be varied is a fixed set that does not vary over time.

The dialog box 400 includes tabs 402, 404, 406 which allow a user to select the particular identity parameter that he wants to work with for purposes of creating a mission plan. For purposes of this disclosure, the dialog box 400 facilitates dynamic variation of only three identity parameters. Specifically, these include the IP address, MAC address and Port Address. More or fewer identity parameters can be dynamically varied by providing additional tabs, but the three identity parameters noted are sufficient to explain the inventive concepts. In FIG. 4, the user has selected the tab 402 to work with the IP Address type of identity parameter. Within tab 402, a variety of user interface controls 408-420 are provided for specifying the details relating to the dynamic variation of IP addresses within the selected module. More or fewer controls can be provided to facilitate the dynamic manipulation of the IP Address type, and the controls shown are merely provided to assist the reader in understanding the concept. In the example shown, the network administrator can enable dynamic variation of IP addresses by selecting (e.g. with a pointing device such as a mouse) the check-box 408 marked: Enable IP Address Hopping. Similarly, the network administrator can indicate whether the source address, destination address or both are to be varied. In this example, the source and destination address boxes 410, 412 are both marked, indicating that both types of addresses are to be changed. The range of allowed values for the source and destination addresses can be specified by the administrator in list boxes 422, 424.

The particular pseudorandom process used to select false IP address values is specified by selecting a pseudorandom process. This selection is specified in boxes 414, 415. Different pseudorandom processes can have different levels of complexity for variable degrees of true randomness, and the administrator can choose the process that best suits the needs of the network 100.

Dialog box 400 also allows a network administrator to set the trigger type to be used for the dynamic variation of the IP Address identity parameter. In this example, the user has selected box 416, indicating that a time based trigger is to be used for determining when to transition to new false IP address values. Moreover, checkbox 418 has been selected to indicate that the time based trigger is to occur on a periodic basis. Slider 420 can be adjusted by the user to determine the frequency of the periodic time based trigger. In the example shown, the trigger frequency can be adjusted between 6 trigger occurrences per hour (trigger every 10 minutes) and 120 trigger occurrences per hour (trigger every 30 seconds). In this example, selections are available for other types of triggers as well. For example, dialog box 402 includes check boxes 428, 430 by which the network administrator can select an event-based trigger. Several different specific event types can be selected to form the basis for such event-based triggers (e.g., Event type 1, Event type 2, etc.). These event types can include the detection of various potential computer network security threats. In FIG. 4, tabs 404 and 406 are similar to tab 402, but the controls therein are tailored to the dynamic variation of the MAC Address and Port value rather than the IP Address. Additional tabs could be provided for controlling the dynamic variation of other types of identity parameters.

The mission plan can also specify a plan for dynamically varying the location where identity parameters are modified. In some embodiments, this variable location feature is facilitated by controlling a sequence that defines when each module is in an active state or a bypass state. Accordingly, the mission plan advantageously includes some means of specifying this sequence. In some embodiments of the invention, this can involve the use of defined time intervals or time slots, which are separated by the occurrence of a trigger event.

Figure 5:
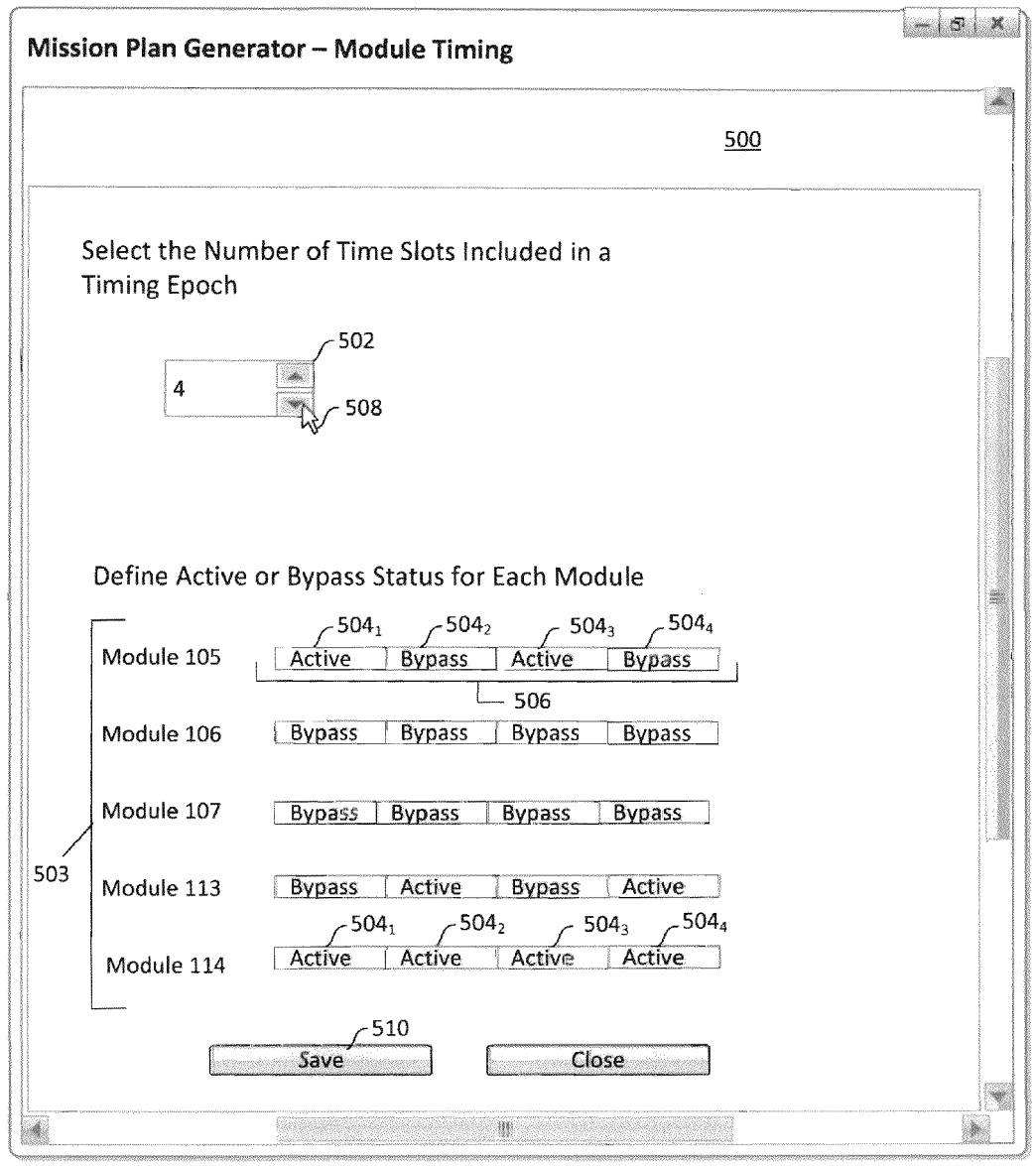
FIG. 5 is an example of a dialog box of a graphical user interface that can be used to select a sequence of active states and bypass states associated with each module in FIG. 1.

Referring now to FIG. 5, a dialog box 500 can be provided by the NCSA to facilitate coordination and entry of location sequence and timing information. Dialog box 500 can include a control 502 for selecting a number of time slots $504_1$-$504_n$ which are to be included within a time epoch 506. In the example illustrated, the network administrator has defined 4 time slots per timing epoch. The dialog box 500 can also include a table 503 which includes all modules in the network 100. For each module listed, the table includes a graphical representation of available time slots $504_1$-$504_4$ for one timing epoch 506. Recall that dynamic control over the location where identity parameters are manipulated is determined by whether each module is in an active or bypass operating states. Accordingly, within the graphical user interface, the user can move a cursor 508 and make selections to specify whether a particular module is in an active or bypass mode during each time slot. In the example shown, module 105 is active during time slot $504_1$ and $504_3$, but is in a bypass mode during time slots $504_2$, $504_4$. Conversely, module 113 is active during time slots $504_2$, $504_4$, but is in bypass mode during time slots $504_1$ and $504_3$. With reference to FIG. 1, this means that manipulation of identity parameters occurs at a location associated with module 105 during time slots slot $504_1$ and $504_3$, but occurs instead at module 113 during time slots $504_2$, $504_4$.

In the example shown in FIG. 5, the network administrator has elected to have module 114 always operate in an active mode (i.e. module 114 is active during all time slots. Accordingly, for data communications transmitted from client computer 101 to client computer 103, data packets will alternately be manipulated in modules 105, 113, but will always be manipulated at module 114. Finally, in this example, the network administrator has elected to maintain modules 106 and 107 in a bypass mode during time slots $504_1$-$504_4$. Accordingly, no manipulation of identity parameters will be performed at these modules during any of the defined time slots. Once the module timing has been defined in dialog box 500, the network administrator can select the button 510 to store the changes as part of an updated mission plan. The mission plan can be saved in various formats. In some embodiments, the mission plan can be saved as a simple table or other type of defined data structure that can be used by each module for controlling the behavior of the module.

Distribution and Loading of Mission Plans

The distribution and loading of mission plans as disclosed herein will now be described in further detail. Referring once again to FIG. 1, it can be observed that the modules 105-107, 113, 114 are distributed throughout the network 100 at one or more locations. The modules are integrated within the communications pathways to intercept communications at such locations, perform the necessary manipulations, and forward data to other computing devices within the network. With the foregoing arrangement, any necessary maintenance of the modules described herein (e.g. maintenance to update a mission plan) will have the potential to disrupt network communications while the modules are replaced or reprogrammed. Such disruptions are undesirable in many situations where reliability and availability of network services is essential. For example, uninterrupted network operation can be essential for computer networks used by military, emergency services and businesses.

In order to ensure uninterrupted network operations, each module preferably has several operating states. These operating states include (1) an off state in which the module is powered down and does not process any packets, (2) an initialization state in which the module installs software scripts in accordance with the mission plan, (3) an active state in which data is processed in accordance with a current mission plan, and (4) a by-pass state in which packets can flow through the module as if the module was not present. The module is configured so that, when it is in the active state or the by-pass state, the module can receive and load an updated mission plan provided by a network administrator. The module operating states can be manually controlled by the network administrator by means of the NCSA executing, for example, on NAC 104. For example, the user can select operating states for various modules through the use of a graphical user interface control panel. Commands for controlling the operating states of the network are communicated over the network 100, or can be communicated by any other suitable means. For example, a separate wired or wireless network (not shown) can be used for that purpose.

Figure 6:
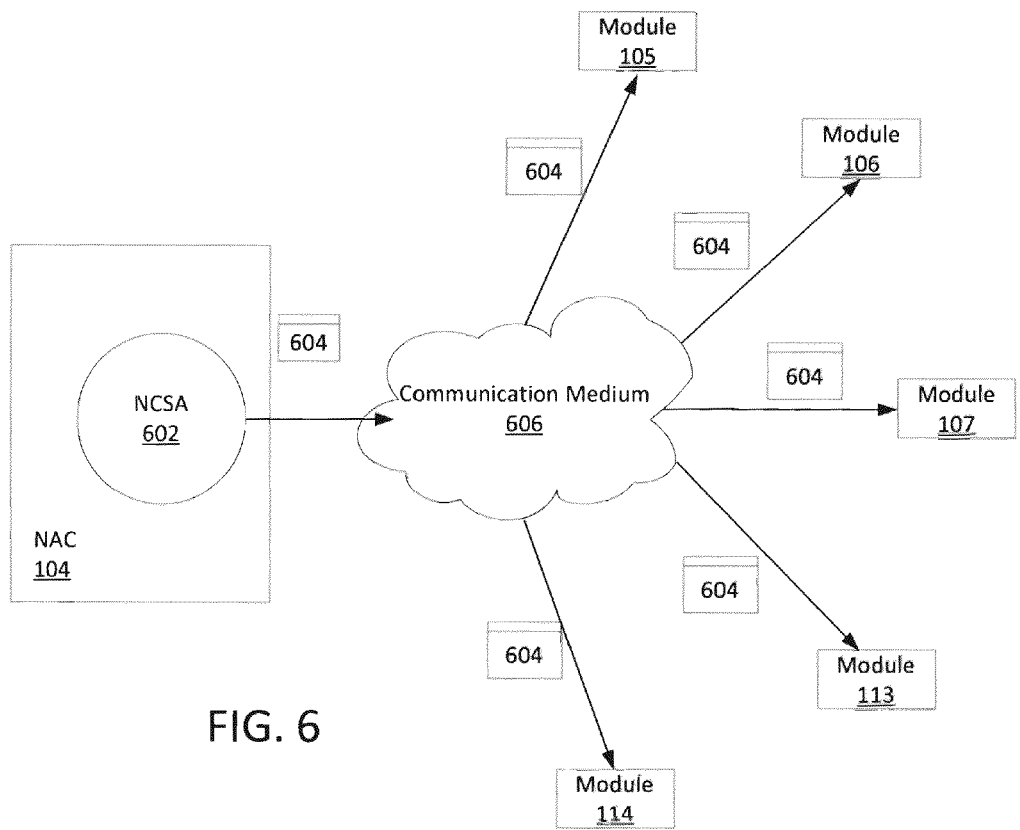
FIG. 6 is a diagram that is useful for understanding the way in which a mission plan can be communicated to a plurality of modules in the network in FIG. 1.
Figure 7:
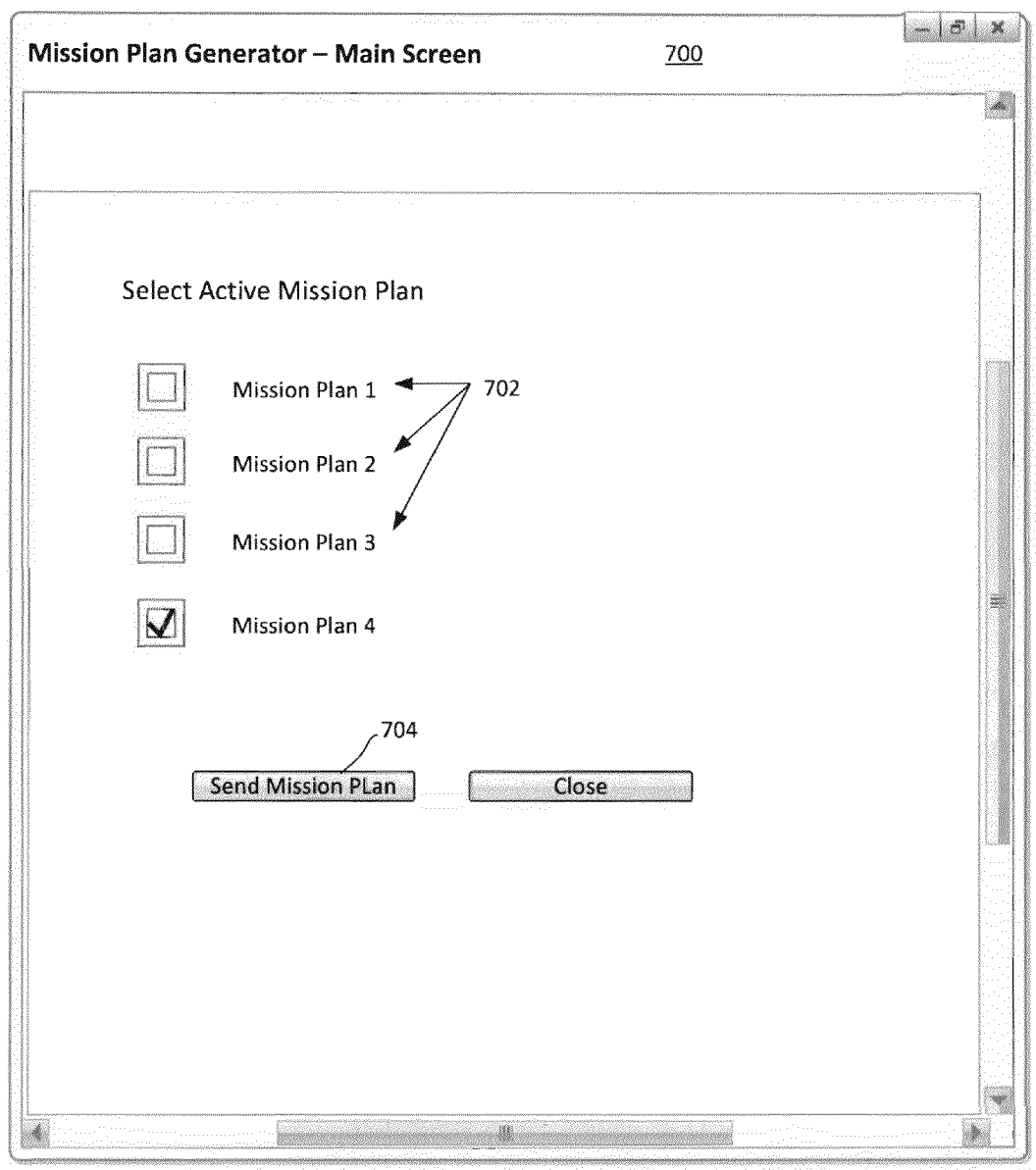
FIG. 7 is an example of a dialog box of a graphical user interface that can be used to select a mission plan and communicate the mission plan to the modules as shown in FIG. 6.

The mission plan can be loaded directly at the physical location of each module, or it can be communicated to the module from the NCSA. This concept is illustrated in FIG. 6, which shows mission plans 604 being communicated from NCSA 602 to each of the modules 105-107, 113, 114 over a communication medium 606. In the example shown, the NCSA software application is executing on NAC 104 operated by a network administrator. The communication medium can in some embodiments include in-band signaling using computer network 100. Alternatively, an out-of-band network (e.g. a separate wireless network) can be used as the communication medium 606 to communicate the updated mission plan from the NCSA to each module. As shown in FIG. 7, the NCSA can provide a dialog box 700 to facilitate selection of one of several mission plans 702. Each of these mission plans 702 can be stored on NAC 104. The network administrator can select from one of the several mission plans 702, after which they can activate a Send Mission Plan button 704. Alternatively, a plurality of mission plans can be communicated to each module and stored there. In either scenario, the user can choose one of the defined mission plans to activate.

In response to the command to send the mission plan, the selected mission plan is communicated to the modules while they are in an active state in which they are configured for actively performing dynamic modification of identity parameters as described herein. Such an arrangement minimizes the time during which the network operates in the clear and without manipulating identity parameters. However, the updated mission plan can also be communicated to the modules while they are in the by-pass mode, and this approach may be desirable in certain cases.

Once the mission plan is received by a module, it is automatically stored in a memory location within the module. In one embodiment, the module can be caused to enter the by-pass state and, while still in that state, the module can load the data associated with the new mission plan. This process of entering into the by-pass state and loading the new mission plan data can occur automatically in response to receipt of the mission plan, or can occur in response to a command from the NCSA software controlled by the network administrator. The new mission plan preferably includes changes in the way that identity parameter values are varied. Once the new mission plan has been loaded, the modules 105-107, 113, and 114 can be transitioned from the by-pass mode to the active mode in a synchronized way to ensure that data communication errors do not occur. The mission plan can specify a time when the modules are to return to the active mode, or the network administrator can use the NCSA to communicate a command to the various modules, directing them to enter into the active mode. The foregoing process of updating a mission plan advantageously allows changes in network security procedures to occur without disrupting communication among the various computing devices attached to the computer network 100.

The dynamic manipulation of various identity parameters at each module 105, 106, 107, 113, and 114 is preferably controlled by the application software executing on each module 105-107, 113, 114. However, the behavior of the application software is advantageously controlled by the mission plan.

Figure 8:
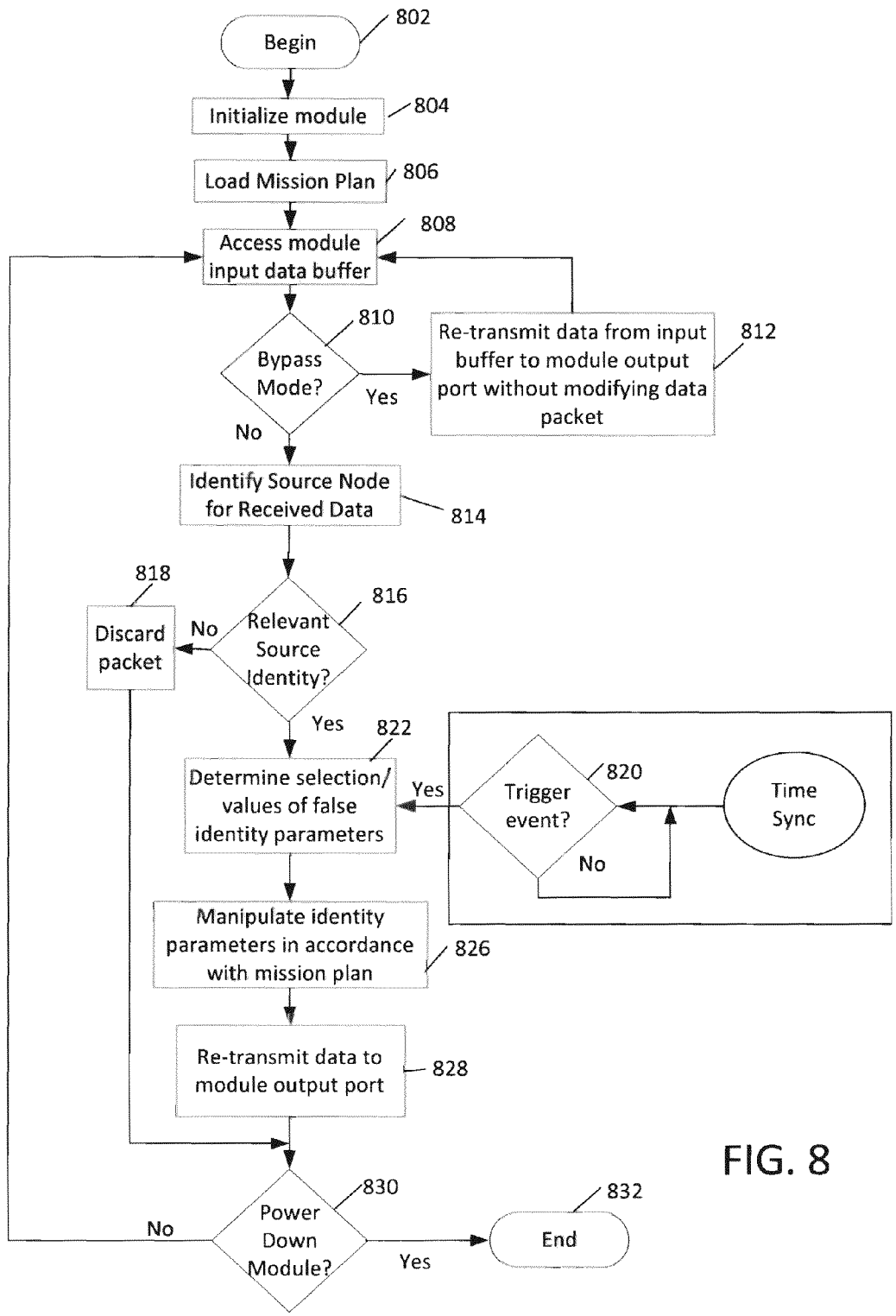
FIG. 8 is a flowchart that is useful for understanding the operation of a module in FIG. 1.

Referring now to FIG. 8, there is provided a flowchart which summarizes the operation of each module 105-107, 113, 114. To avoid confusion, the process is described with respect to communications in a single direction. For example in the case of module 105, the single direction could involve data transmitted from client computer 101 to hub 108. In practice however, it is preferred that modules 105-107, 113, 114 operate bi-directionally. The process begins at step 802 when the module is powered up and continues to step 804 where module application software is initialized for executing the methods described herein. In step 806, a mission plan is loaded from a memory location within the module. At this point, the module is ready to begin processing data and proceeds to do so at step 808, where it accesses a data packet from an input data buffer of the module. In step 810, the module checks to determine if it is in a bypass mode of operation. If so, the data packet accessed in step 808 is retransmitted in step 812 without any modification of the data packet. If the module is not in bypass mode, then it must be in its active mode of operation and continues on to step 814. In step 814, the module reads the data packet to determine the identity of a source node from which the data packet originated. In step 816, it examines the packet to determine if the source node is valid. The specified source node can be compared to a list of valid nodes to determine if the specified source node is currently valid. If it is not a valid node then the packet is discarded in step 818. In step 820 the process checks to determine if a trigger event occurred. The occurrence of a trigger event will influence the selection of false identify values to use. Accordingly, in step 822, the module determines the false identify values to use based on one or more of the trigger information, clock time and mission plan. The module then continues to step 826 where it manipulates identity parameters of the data packet. Once manipulations are complete, the data packet is re-transmitted to an adjacent node from the output port of the module. In step 830, a determination is made as to whether the module has been commanded to power down. If so, the process ends at step 832. In step 808 the process continues and the next data packet is accessed from the module's input data buffer.

Figure 9:
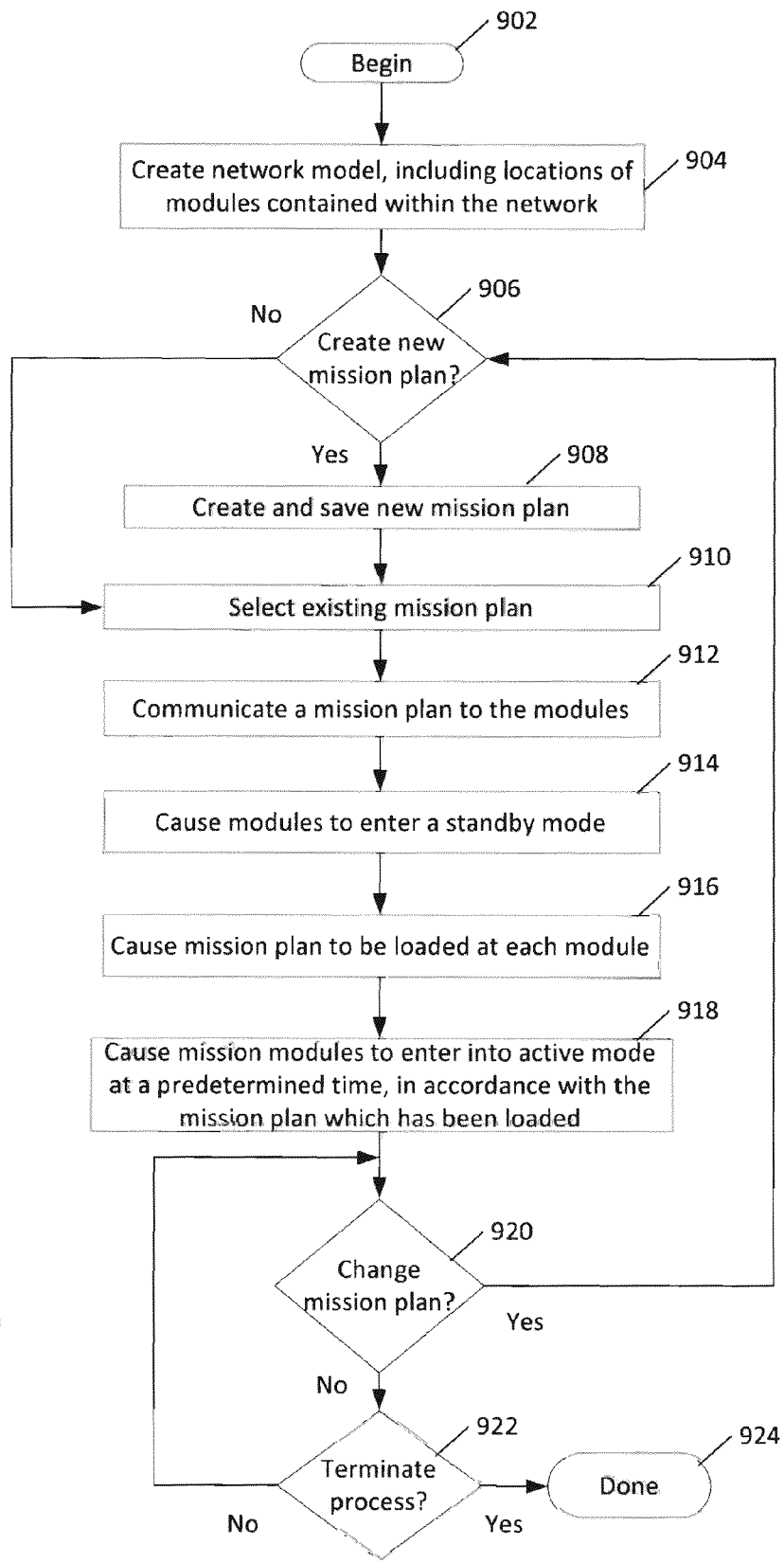
FIG. 9 is a flowchart that is useful for understanding the operation of a network control software application (NCSA) in relation to creating and loading mission plans.

Referring now to FIG. 9, there is provided a flowchart which summarizes the methods described herein for managing a dynamic computer network. The process begins in step 902 and continues to step 904, where a network model is created (e.g., as shown and described in relation to FIG. 3). In step 906, a determination is made as to whether a new mission plan is to be created. If so, a new mission plan is created in step 908 and the process continues to step 910, where the new mission plan is selected. Alternatively, if in step 906 a desired mission plan has already been created, then the method can continue directly to step 910 where an existing mission plan is selected. In step 912, the mission plan is communicated to the modules (e.g., modules 105-107, 113, 114), where the mission plan is stored in a memory location. When the network administrator is ready to implement the new mission model, a command is sent in step 914 which causes the modules to enter a standby mode as described herein. While the modules are in this standby mode, the mission plan is loaded at step 916. Loading of the mission plan occurs at each module so that the mission plan can be used to control the operations of an application software executing on the module. In particular, the mission plan is used to control the way in which the application software performs dynamic manipulations of identity parameters. In step 918, the mission modules are again caused to enter into an active operational mode in which each mission module performs manipulations of identity parameters in accordance with the mission plan. Steps 914, 916, and 918 can occur in response to specific commands sent from a network administrator, or can occur automatically at each module in response to receiving the mission plan in step 912. After step 918, the modules continue performing processing in accordance with the mission plan which has been loaded. In step 920, the process continues by checking to determine if the user has indicated a desired to change the mission plan; if so, the process returns to step 906, where the it continues as described above. If there is no indication that the user or network administrator wishes to change an existing mission plan, then the process determines in step 922 whether it has been instructed to terminate. If so, the process terminate in step 924. If no termination instruction is received, the process returns to step 920 and continues.

Figure 10:
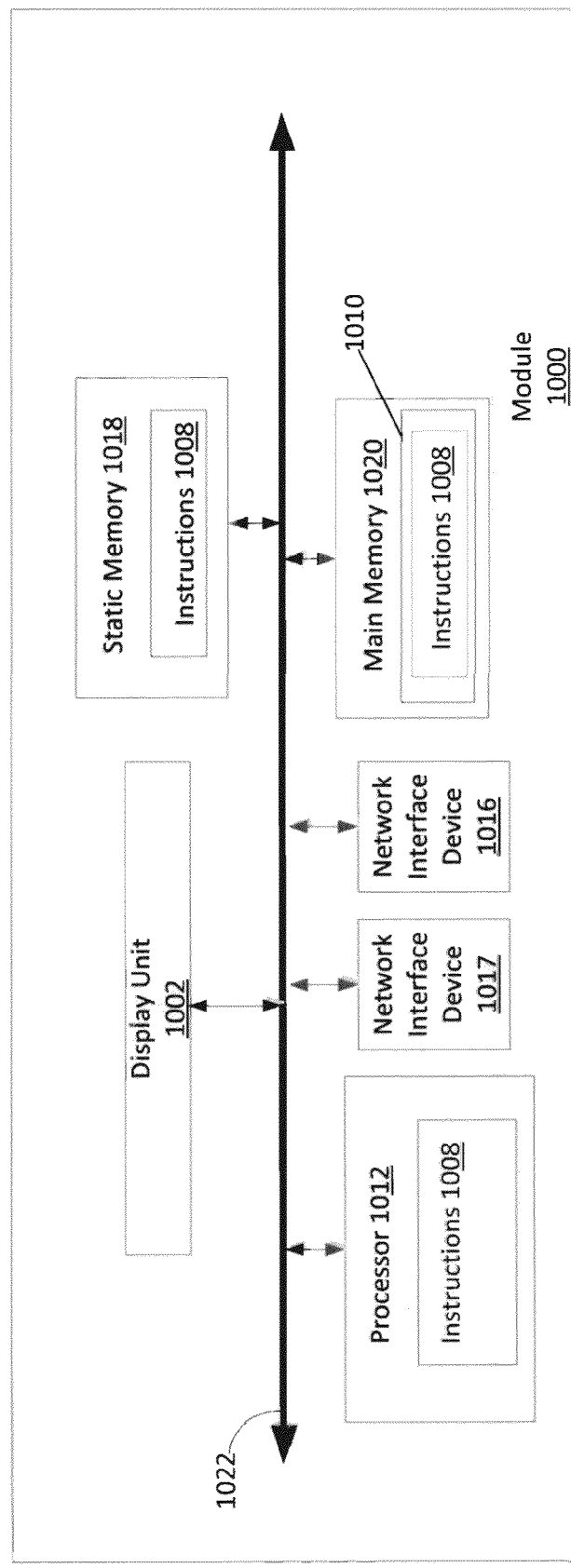
FIG. 10 is a block diagram of a computer architecture that can be used to implement the modules in FIG. 1.

Referring now to FIG. 10, there is provided a block diagram which shows a computer architecture of an exemplary module 1000 which can be used for performing the manipulation of identity parameters described herein. The module 1000 includes a processor 1012 (such as a central processing unit (CPU), a main memory 1020 and a static memory 1018, which communicate with each other via a bus 1022. The computer system 1000 can further include a display unit 1002, such as a liquid crystal display or LCD to indicate the status of the module. The module 1000 can also include one or more network interface devices 1016, 1017 which allow the module to receive and transmit data concurrently on two separate data lines. The two network interface ports facilitate the arrangement shown in FIG. 1, where each module is configured to concurrently intercept and re-transmit data packets received from two separate computing devices on the network.

The main memory 1020 includes a computer-readable storage medium 1010 on which is stored one or more sets of instructions 1008 (e.g., software code) configured to implement one or more of the methodologies, procedures, or functions described herein. The instructions 1008 can also reside, completely or at least partially, within the static memory 1018, and/or within the processor 1012 during execution thereof by the module. The static memory 1018 and the processor 1012 also can constitute machine-readable media. In the various embodiments of the present invention a network interface device 1016 connected to a network environment communicates over the network using the instructions 1008.

Figure 11:
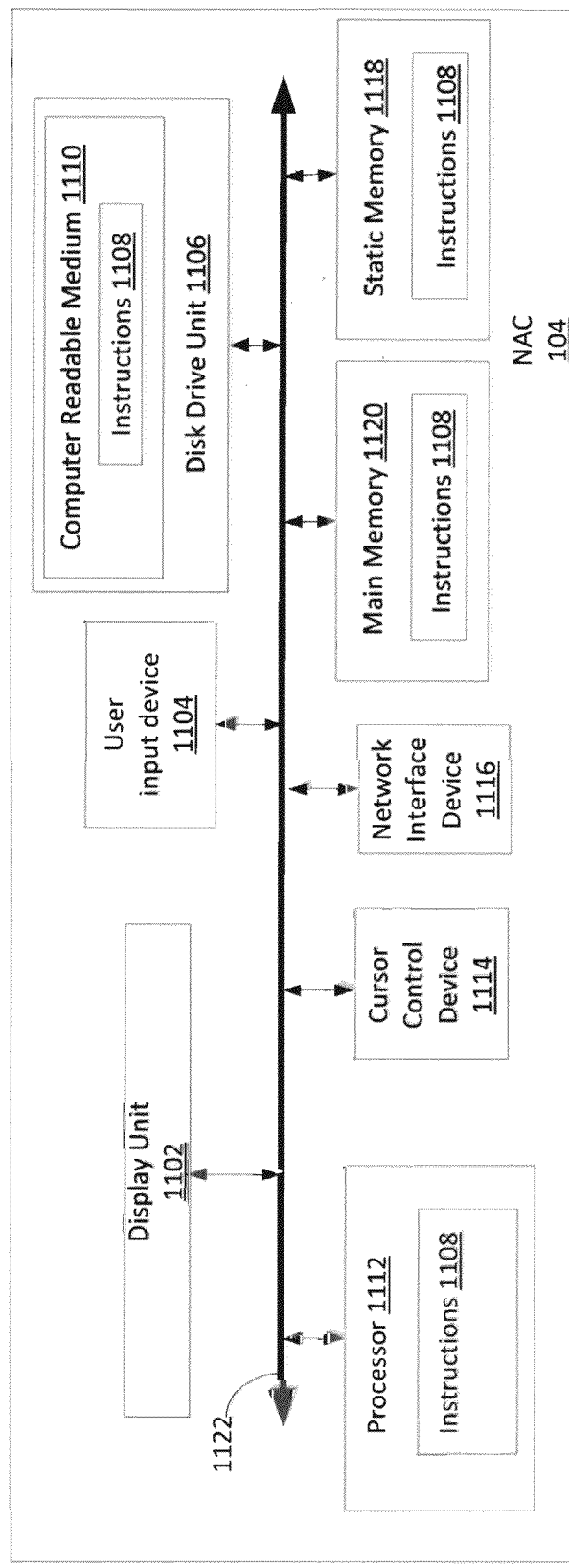
FIG. 11 is a block diagram of a computer architecture that can be used to implement the network administration computer (NAC) in FIG. 1.

Referring now to FIG. 11, there is shown an exemplary network administration computer (NAC) 114 in accordance with the inventive arrangements. The NAC can comprise various types of computing systems and devices, including a server computer, a client user computer, a personal computer (PC), a tablet PC, a laptop computer, a desktop computer, a control system or any other device capable of executing a set of instructions (sequential or otherwise) that specifies actions to be taken by that device. Further, while a single computer is illustrated in FIG. 11, the phrase "NAC" shall be understood to include any collection of computing devices that individually or jointly execute a set (or multiple sets) of instructions to perform any one or more of the methodologies discussed herein.

Referring now to FIG. 11, the NAC 104 includes a processor 1112 (such as a central processing unit (CPU), a disk drive unit 1106, a main memory 1120 and a static memory 1118, which communicate with each other via a bus 1122. The NAC 104 can further include a display unit 1102, such as a video display (e.g., a liquid crystal display or LCD), a flat panel, a solid state display, or a cathode ray tube (CRT)). The NAC 104 can include a user input device 1104 (e.g., a keyboard), a cursor control device 1114 (e.g., a mouse) and a network interface device 1116.

The disk drive unit 1106 includes a computer-readable storage medium 1110 on which is stored one or more sets of instructions 1108 (e.g., software code) configured to implement one or more of the methodologies, procedures, or functions described herein. The instructions 1108 can also reside, completely or at least partially, within the main memory 1120, the static memory 1118, and/or within the processor 1112 during execution thereof. The main memory 1120 and the processor 1112 also can constitute machine-readable media.

Those skilled in the art will appreciate that the module architecture illustrated in FIG. 10, and the NAC architecture in FIG. 11, each represent merely one possible example of a computing device that can be used respectively for performing the methods described herein. However, the invention is not limited in this regard and any other suitable computing device architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium 1010, 1110 is shown in FIGS. 10 and 11 to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Communications with Computing Devices Connected to a Different Logical Network

Before describing further aspects of the inventive arrangements, it is useful to consider the operation of conventional switches. Conventional switches connect multiple segments of a network together. The simplest devices that perform this function are called "hubs" and operate at the physical layer. Hubs do not perform any traffic management tasks on data packets but simply copy all data traffic entering at a port and broadcast it out all other ports. Layer 2 (or "network") switches operate up to the link layer and have the ability to inspect packets entering the switch and to direct each packet to the proper port based on the destination physical address of the link layer packet. Switches differ from hubs in that they can forward packets to their destination without broadcasting across every port. Multi-layer switches (e.g. layer 3 switches) can operate up to the network, transport, and/or application layers and are able to perform operations that require knowledge of higher layer protocols such as IP multicasting, IP security, firewalling, load balancing, secure sockets layer encryption/decryption, and the like. Switches that operate at higher layers can perform some or all of the functions of routers and bridges. Conversely, routers and bridges can also perform lower layer switching functions.

Switches forward packets to the next hop by associating each output port with a particular physical address. As mentioned above, switches operate primarily in the data link layer. Data link layer messages (i.e. data packets) are addressed to physical addresses that represent the "next hop" in the data packet's path. An example of a physical address is the Media Access Control (MAC) address for the network interface of the host machine. MAC addresses are resolved using a link layer protocol such as address resolution protocol (ARP) and this information is then stored in a table for quick reference, e.g. an ARP table. When a packet is received that is destined for a particular host, the switch looks up the destination MAC address on the ARP table, locates the port associated with that MAC address and forwards the packet. If the MAC address for the destination host is not listed in the ARP table, the switch can broadcast an ARP polling message on every output port. If the destination host is connected to the switch, it will answer with an acknowledgement and the switch will forward the packet to the host using the port that received the acknowledgement. The switch can also record the port and network address in the ARP table for future forwarding to that MAC address.

Multi-layer switches that operate in the network layer or above can use logical addresses, e.g. IP addresses, to forward packets to their destination. Although network layer functions and above are typically handled by routers, there is little functional difference between a conventional router and a layer 3 (or network layer) switch. In either case, the switch (or router) receives a data packet destined for a particular host that has a logical address (i.e. a network layer or protocol address). After receiving the packet, the network layer switch will compare the destination IP address of the packet to a routing table to determine both the logical and physical address of the next hop in the path to the destination host. The network layer switch then transmits the packet to the next hop. The primary difference between the packet received at a layer 3 switch as compared to a packet received by a layer 2 switch is that the destination address (e.g. MAC address) of the link layer packet received at the layer 3 switch is that of the switch itself. As explained above, a link layer packet is addressed to the next hop of the packet's path. The layer 3 switch (or router) that receives the packet is the next hop of that packet and is tasked with determining the next hop for the packet based on the network layer address (e.g. IP address) or other information contained in the packet. In contrast, a layer 2 switch that receives a packet reads the link layer destination address and forwards the packet to the next hop, but the layer 2 switch itself is not a destination.

A Moving Target Technology (MTT) switch is able to perform packet forwarding as described above for an MTT enabled network operating in accordance with a mission plan. An MTT switch is able to perform the native functionality of a switch, described above, and for MTT enabled traffic. In some embodiments, the MTT switch can also be arranged to automatically distinguish between MTT enabled traffic and conventional data traffic for purposes of determining how to properly perform such switching operations. The mission plan defines a set of transformations that are performed on identity parameters of the data traffic within an MTT enabled network and the locations where such transformations are performed within the network. As with the modules, MTT enabled switches can be loaded with one or more mission plans. Additionally, MTT switches can perform the functions of modules and transform the identity parameters of data packets in accordance with the mission plan.

Current switch technology forwards data by "locking" a particular physical address to a particular port on the switch in the ARP table, as described above. Consequently, conventional switches are unable to process MTT enabled traffic because the identity parameters would move in accordance with the mission plan. For example, the IP address of the source and/or destination host, MAC address of the source and/or destination host, or both may be dynamically modified prior to reaching the switch. MTT enabled switches have the ability to operate according to the mission plan and correctly forward switched data packets with moving identities. For example, when a packet arrives at an MTT switch, the identity parameters of the data packet are analyzed and the destination host is compared to a dynamic ARP table that is driven and modified by the mission plan. Note that the terms dynamic and static describe the use of dynamic or static identity parameters. Although both terms are used in describing conventional ARP tables, as used herein a "dynamic ARP table" is a table populated in accordance with an MTT mission plan and a "static ARP table" is a table populated using convention methods known in the art.

The dynamic ARP table is populated and/or modified by the mission plan. The mission plan has information concerning manipulation of identity parameters throughout the entire network and therefore can supply the switch with a fully populated ARP table for use in forwarding packets. This dynamic modification of the ARP table can occur in a number of ways. In certain embodiments, the values in the ARP table are populated by the mission plan when it is loaded into the switch. In such embodiments, the ARP table values are rewritten each time a new mission plan is activated. In other words, the values in the ARP table are changed to facilitate correct switching of packets using the identity parameters as currently manipulated for use in the network according to the mission plan. In other embodiments, the relationships between the values in the ARP table are updated by the mission plan. For example, the relationships between ports and the various device addresses can be updated by the mission plan. In each embodiment, the mission plan updates or modifies the ARP table so that the switch functions correctly with the manipulated identity parameters in use at that particular time. As described above, the manipulation of identity parameters can change based on a trigger event. The mission plan will define what changes occur in response to a particular type of trigger event. Therefore, each trigger event can cause a modification or update to a dynamic ARP table.

In one embodiment, a switch includes dedicated ports that service both a static and an MTT enabled network. In effect, the switch is split with static ports servicing a static network and MTT ports servicing a dynamic network. In such a scenario, each set of ports can have a separate ARP table or can share an ARP table that includes a static section and an MTT section. At least that portion of the ARP table servicing the MTT enabled ports is determined in accordance with a mission plan, and varies in response to predetermined trigger events defined by the mission plan. In another embodiment, the switch can identity MTT enabled traffic and transform the identity parameters of the data packets into static identity parameters, i.e. true identity parameters. After the identity parameters have been transformed, the switch can process the data packets using conventional switching algorithms using a conventional ARP table. The switch can thereafter forward the packets containing the true identity parameters, or can forward the packets with false identity parameters. The false identity parameters can be the same as those contained in the packet when received, or the switch can manipulate the identity parameters to include a different set of false identity parameters. The way the packets are processed in either case can be determined by a mission plan as described above.

In certain embodiments, both static and dynamic data traffic can be present in the network at the same time. Therefore, the capability to accommodate both static and dynamic traffic is important. For example, data can be either static or dynamic based on the value or importance of the data. A host computer operating in accordance with a particular mission plan can enable MTT for data transmitted with a particular application or to a particular server. In contrast, web browsing data or other low priority data can be sent without enabling MTT. Therefore, all network equipment, including switches, can simultaneously accommodate both static and dynamic traffic and is fully capable of handling transformations and forwarding of MTT enabled packets in addition to forwarding of static packets through the same network.

In certain embodiments, the switch can be connected to multiple networks operating different mission plans. Alternatively, one or more of the networks connected to the switch can be static, i.e. not MTT enabled. In these situations, the switch can act like a bridge and be able to translate between networks operating different mission plans or between an MTT network and a static network. Switches operating between these network boundaries can have an ARP table for each network, or have an ARP table with multiple sections where each section corresponds to a different network. In either scenario, the ARP table can be dynamically populated in accordance with a mission plan.

In addition to forwarding MTT enabled data packets in accordance with a mission plan, MTT switches are also able to manipulate switching behavior based on the mission plan by pseudorandomly alternating the output port that is used for communicating packets to a particular destination. For example, a switch can have one port that leads to a router connected to another network in the same enterprise wide area network. The switch can have a second port that leads to a gateway into the Internet. Both paths can lead to the same destination and the switch can pseudorandomly alternate between the paths when communicating packets to the same ultimate destination. Alternatively, or in addition thereto, the switch can broadcast extraneous packets on some or all ports to create noise within the network. The extraneous packets can contain useless bits of random data or encrypted data to confuse and harass individuals and systems trying to infiltrate the network. The MTT switch can alternate between these behaviors or any combination thereof in accordance with one or more mission plans.

Optionally, the switch can further apply a set of filtering rules to function as a firewall. In certain embodiments, the switch can identify MTT enabled traffic based on a mission plan and filters out all other traffic. In other embodiments, the switch can detect anomalies in the data traffic. The filtering rules can be designed so that the switch directs non-MTT enabled and/or anomalous packets to a "honeypot" server that can mimic the behavior of network systems to lure attack traffic. By filtering non-MTT enabled and/or anomalous packets to the honeypot, especially those associated with attack traffic, a network administrator is able to prevent an attack, analyze network vulnerabilities, and/or develop new techniques for countering attacks based on the behavior of the disallowed traffic. Alternatively, the non-MTT enabled packets can be discarded out right, or filtered using conventional firewalling techniques.

Figure 12:
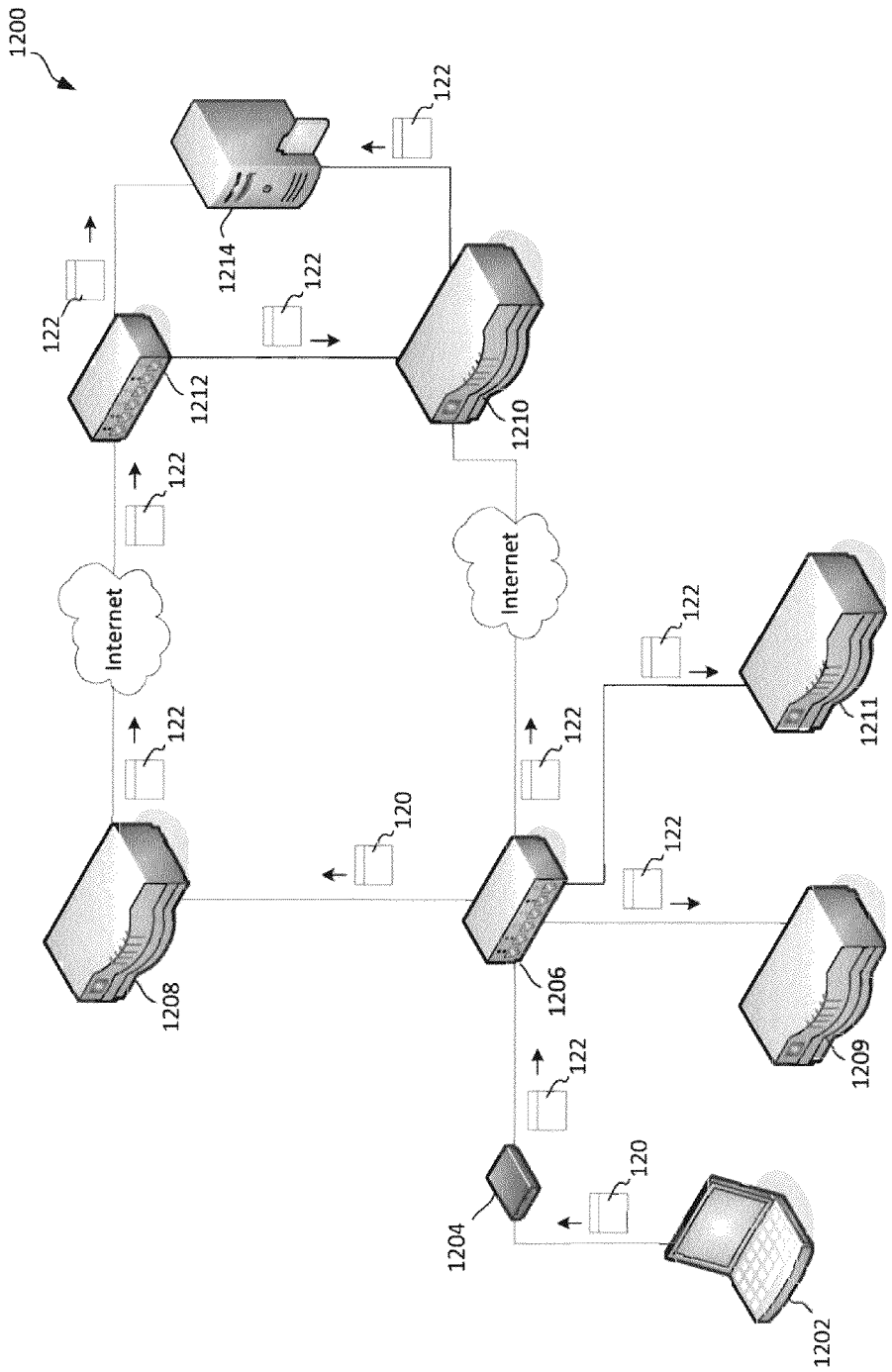
FIG. 12 is an example of a computer network that is useful for understanding the present invention

To further understand this function of the MTT switches described herein, consider FIG. 12 and the following examples. Referring now to FIG. 12, an exemplary network is provided. The network includes host 1202, module 1204, switches 1206, 1212, routers 1208, 1210, and host 1214. As shown in FIG. 12, a data packet is sent with identity parameters 120. In one exemplary embodiment, module 1204 can transform identity parameters 120 into identity parameters 122 as previously described. In alternative embodiments, module 1204 may be within host 1202 or switch 1206. Additionally, routers 1208, 1210, switch 1212, and host 1214 can also include a module. Although FIG. 12 illustrates data packets traveling in one direction, one of skill in the art will recognize that data traffic can flow in both directions using well known duplexing techniques.

In a first example, a network segment comprises three separate components connected in series: a PC 1202, an MTT module 1204, and an MTT switch 1206. The PC 1202 is the source host for a data stream that enters a dynamic network through the switch 1206. Connected between the PC 1202 and the switch 1206 is a module 1204 that is capable of performing pseudorandom transformations on the data stream transmitted by the PC 1202. When the data stream reaches the switch 1206, various identity parameters 122 of the data packets within the stream appear to have been transformed in random ways by the module 1204. More particularly, some of the identity parameter values 120 are pseudorandomly transformed to false values 122 in accordance with a mission plan. The MTT enabled switch 1206 operates in accordance with the same mission plan, and therefore remains able to properly forward packets in the data stream to the next interface. In an alternative configurations, the module 1204 need not be a separate component but may be embedded within a PC 1202, as discussed above.

In a second example, the module 1204 is embedded within the switch 1206 and the switch 1206 itself is able to transform data packet identity parameters 120 according to the mission plan. In such a scenario, the switch can receive a data stream that is non-MTT enabled, i.e. the identity parameters 120 of the data packets have not been transformed. The switch then modifies the identity parameters to specify false identity parameters 122 before they are forwarded out into the network. The transformation at the switch 1206 can occur at the input port or the output port. In other words, the identity parameters 120 can be transformed either before or after the switch determines which port to forward the packets through.

In a third example, an MTT switch 1206 connects two networks that operate according to different mission plans, represented in FIG. 12 as the networks connected to routers 1208, 1210. For clarity and to avoid obscuring the invention, the networks attached to routers 1208, 1210 are not shown. Specifically, one of the networks, e.g. router 1208, is a static network that is not MTT enabled. Data traffic that is transmitted between the two networks must be translated by the switch 1206 before it can be forwarded to the other network. For example, the identity parameters 122 of a data packet arriving at the switch from the MTT enabled network must be translated to specify static values 120. Conversely, the identity parameters of a data packet arriving at the switch from the static network must be translated to specify the identity parameters that are in accordance with the currently active mission plan.

In a fourth example an MTT switch 1206 connects networks A (i.e., router 1209), B (i.e., router 1210), C (i.e., router 1211) and D (i.e., router 1208). Networks A, B and C are dynamic MTT enabled networks operating in accordance with one or more mission plans. Network D is a static network that is not MTT enabled. When data is received at the MTT switch 1206, it evaluates the packets to determine if they comprise MTT enabled data having false identity parameters corresponding to a current status of network A, B, or C (i.e., corresponding to what is expected according to the current mission plan of networks A, B, or C). If so, the switch 1206 performs appropriate MTT processing using one or more mission plans to route the data to an appropriate destination network. This processing can involve transforming a set of false identity parameters (e.g., if the packet was sourced from an MTT enabled network) to a set of true identity parameters if the destination network is a static network (network D, router 1208, in this example). Alternatively, such processing can involve transforming a first set of false identity parameters corresponding to an MTT enabled source network (e.g., network A, router 1209) to a second set of false identity parameters corresponding to an MTT enabled destination network (e.g., network B, router 1210). The first and second sets of false identity parameters can include different selections of identity parameters which are made false and/or different false values for the same set of identity parameters. Alternatively, if the switch 1206 determines that a received packet contains erroneous MTT data that does not correspond to the current state of any network, then the received packet can be discarded or sent to a "honeypot" as described above.

The exemplary configurations described above are not meant to be limiting. Further, the embodiments are not limited to the network topology illustrated in FIG. 12. As mentioned above, the function of a switch can be built in to other network devices, e.g., routers and bridges. Additionally, the functions of modules and firewalls can be incorporated into switches, routers, and/or bridges. Network components can be combined to arrive at a dynamic network system that fits any set of needs.

Figure 13:
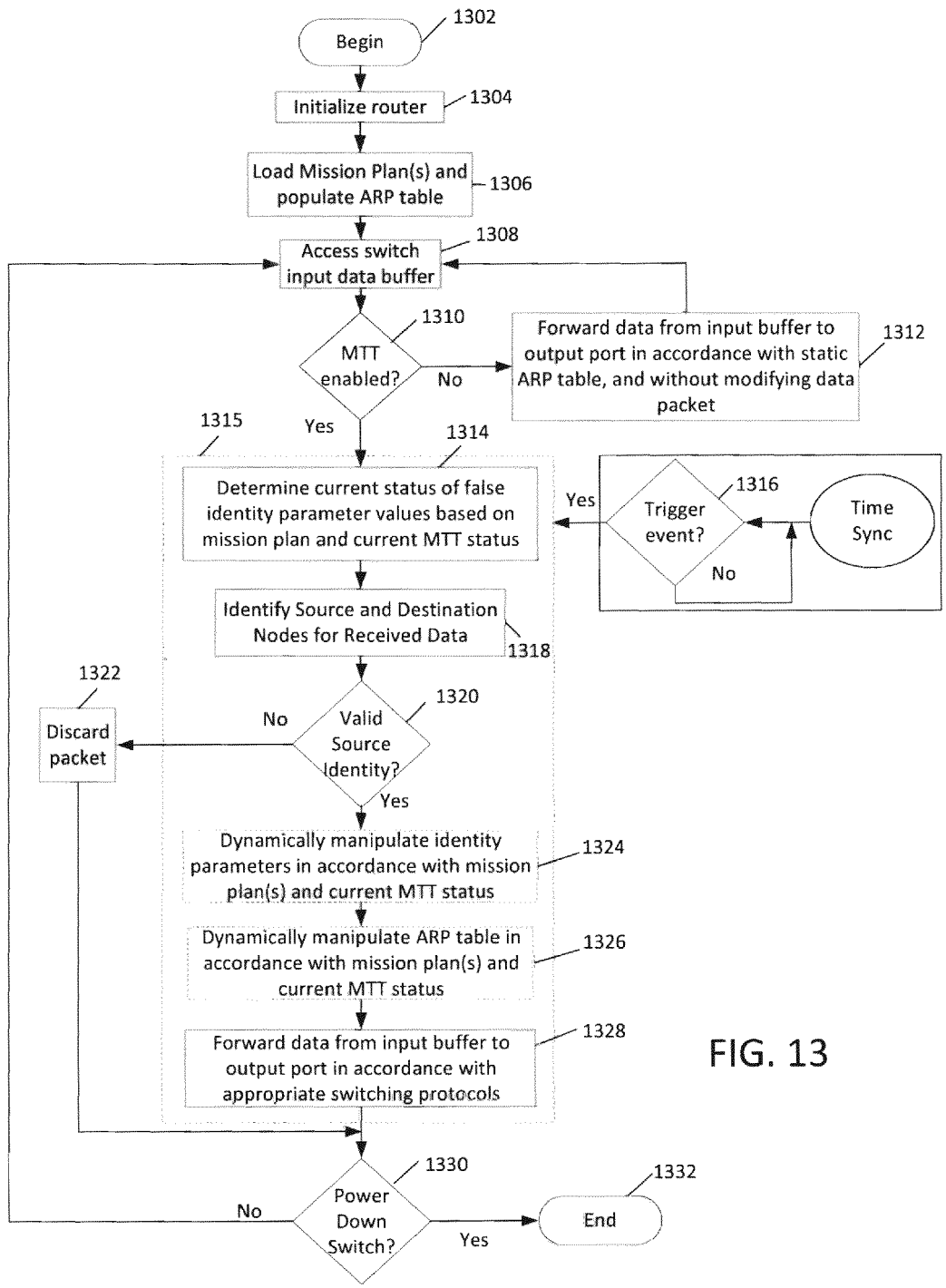
FIG. 13 is a flowchart that is useful for understanding the operation of a switch in FIG. 1.

Referring now to FIG. 13, a flowchart of process 1300 is provided to further illustrate the operation of an MTT switch. The process begins at step 1302 when the switch is powered up and continues to step 1304 where switch application software is initialized for executing the methods described herein. In step 1306, one or more mission plans are loaded from a memory location within the switch. The ARP table is also populated in accordance with the mission plan. A mission plan can define a dynamic maneuvering of a plurality of network segments within a single dynamic computer network. One or more mission plans can be loaded in a switch in a manner similar to that described above in relation to modules. In a preferred embodiment, the mission plans are loaded into the memory associated with the switch and are activated. The state of each mission plan will generally be determined based on one or more trigger events. The trigger event is any predetermined type of stimulus which causes an operation of the mission plan to dynamically change the way that identity parameters are being manipulated in the network. As such, the occurrence of a trigger event effectively results in an MTT device (e.g. the switch) that is able to distinguish between traffic received before the trigger event, which is processed using previously active rules, and traffic received after the trigger event, which is processed using the newly activated rules. As noted above, the trigger event can result from a variety of different conditions and input stimuli applied to the network. In some embodiments, the mission plans stored for use by the switch may be loaded into memory when the switch is not active, or during a time when the MTT operations of the network are disabled, e.g. when the switch is in a by-pass state. Once a mission plan has been loaded, the switch is ready to begin processing data and proceeds to do so at step 1308, where it accesses a data packet from an input data buffer of the switch.

In step 1310, the switch checks to determine if the MTT mode of operation has been enabled in the network. If not (1310: No), the data packet accessed in step 1308 is directed in step 1312 to an output port using a static ARP table which is arranged to ensure proper forwarding of packets that contain true identity parameter values. In other words, this mode is used when the MTT mode of operation is not active and all identity parameters are assumed to have their true values. The switch communicates the data packet to the appropriate output port in step 1312 without any modification of the data packet, in the same way that a conventional switch would. If the MTT mode is enabled (1310: Yes), then the process continues on to step 1314.

The network will have some MTT status that defines how the identity parameters in the network are currently being manipulated. In step 1314, the switch determines the current status of false identity parameter values based on the mission plan and the current MTT status. In step 1316, the system periodically checks to determine if a trigger event has occurred that would change the MTT status. This step of checking for the occurrence of a trigger event can be performed periodically as shown based on a clock signal, or it can be performed at any time during the process included within box 1315. This is an important step because the occurrence of a trigger event can have a significant effect upon the calculation of proper false identify values that are currently in use in the network. The information from step 1316, and any other appropriate information concerning the MTT status of the network, is then used to determine the current status of any MTT manipulations that are in use by the network at that time. For example, in step 1314 the occurrence of a trigger event can cause the system to generate an updated cross-reference, or look-up, table which includes any false identity parameter values which are in use at that time, and the corresponding true identity parameter values. The information concerning which identity parameters are false, and the true values for such identity parameters can be determined using a pseudo-random process as previously described. As shown in FIG. 13, the trigger event can occur during any of the processing steps 1314, 1318, 1320, 1324, 1326, and 1328 and will trigger an immediate re-determination of the current MTT status (e.g., current status of false identity parameter values) at that time.

Optionally, non-repudiation of the MTT identity parameters can be enabled at step 1314. Non-repudiation is a security service that allows the network administrator to discover the MTT identities used by the dynamic network at any time. As a result, the true identities of the network sources and destinations are knowable notwithstanding the potentially pseudorandom nature of the identity parameters of network traffic and cannot be "repudiated" to deny responsibility. In one embodiment, this may be achieved by simple logging of all false identities. Therefore a logging function is performed whereby all false identity parameters determined in step 1314 are recorded, for example, in memory. Alternatively, non-repudiation may be achieved through time-stamped recording of the pseudorandom function and the seed value associated with the current state of the MTT mission plan. This allows a network administrator to look backward at any time during the operation of the network to "reconstruct" the network identities from the pseudorandom function and the seed value used by the mission plan at that time.

In step 1318, the switch reads the data packet to determine the identity of a source node from which the data packet originated, and the destination node. The source and destination address information of the received data is important because it is needed to permit the switch to determine how to properly manipulate the identity parameters contained within the data communication. In step 1320, the switch examines the data packet to determine if the source node is valid. This can be accomplished by comparing the source node specified in the data packet to a current list of valid source nodes which are currently in use (e.g., as determined in step 1314). If the source node information is not valid then the packet is discarded in step 1322. Steps 1324 and 1326 are optional steps which are discussed below in further detail.

The process continues on to step 1328 at which point the switch directs the packet to the appropriate output port. This step preferably includes appropriate actions to ensure proper forwarding of packets that contain false identity parameters. More particularly, this step ensures that the next destination for the data communication is a correct path for the data communication in accordance with true information corresponding to the false identity parameters, and in accordance with the mission plan. Recall that the information in the false identity parameter will be inconsistent with true identity parameter values, so appropriate adjustments must be made to accommodate the false information, while still ensuring proper forwarding of data messages. There are at least two possible methods to address this problem. In some embodiments, step 1328 can involve a cross-referencing process by which true identity parameter values are determined for any false identity parameters contained in a packet. For example, the look-up table generated in step 1314 can be used for this purpose. Once the true values are determined for such identity parameters, the switch can use a static ARP table (i.e., the same table used in step 1312) to determine the correct output port for a particular packet. Thereafter, the packet can be directed to the correct output port. Alternatively, a dynamic ARP table can be generated for use in step 1328. The dynamic ARP table can directly specify a correct output port or ports corresponding to false identity parameter information contained in a data packet. Other methods are also possible and the invention is not intended to be limited to the two approaches described here.

In step 1330, a determination is made as to whether the switch has been commanded to power down. If so, the process ends at step 1332; otherwise, the process returns to 1308. In step 1308 the process continues and the next data packet is accessed from the switch's input data buffer.

In the process described above, the switch performs forwarding operations which ensure that data packets containing false identity parameters are nevertheless communicated to their proper destination node or nodes. In addition to performing such basic forwarding functions, the switch can also be configured to perform dynamic manipulations of identity parameters in a manner similar to that described above with respect to the modules. Referring again to FIG. 13, optional step 1324 can comprise dynamic manipulation of identity parameters in accordance with a mission plan and a current dynamic network status. The operations at step 1324 would be similar to identity parameter manipulations performed by modules 105-107, 113, 114 as described above. Upon completion of such manipulation of the identity parameters, the process would continue essentially as described above in relation to step 1328. Forwarding operations would be performed using the current identity parameter values as manipulated by the switch. Notably, the manipulation operations in step 1324 can be selectively toggled on and off in accordance with a mission plan. This process is similar to the bypass mode described above in relation to the modules, and can facilitate varying a location within a network where identity parameter manipulation is performed. This bypass mode of operation can be implemented in steps 1310 and 1312 as described above. Alternatively, step 1324 can be bypassed individually.

In the process as described thus far, identity parameters have been manipulated, but the forwarding protocol has been static. In other words, the rules for forwarding of packets have remained the same over time and these rules have not been affected by changes in the MTT status of the network. Packets are always routed along the same path or paths as they would be forwarded in a default forwarding scenario having a static ARP table. In addition to these static routing methods, the inventive arrangements can include dynamic forwarding.

In order to more fully understand the concept of dynamic forwarding, it is useful to consider an example. In the default forwarding scenario described above in reference to FIG. 12, switch 1206 directs a packet destined for server 1214 to router 1210 (via the Internet or some other public network) because this path has the shortest number of hops. However, in a dynamic forwarding embodiment of the invention, the forwarding protocol of each switch and/or router can be dynamically modified so that the way that a packet is forwarding by a particular switch/router will change over time (and under different conditions). Such variations in forwarding will not be predictable without access to information specified in the mission plan. Accordingly, a mission plan can specify, for example, that sometimes the packet destined for server 1214 be directed to router 1208 instead of directly to router 1210. The packet is then directed through the Internet (or any other public network) to switch 1212 and to the final destination, server 1214. At other times, a packet destined for the same server can have a different path. In such embodiments involving dynamic forwarding, the path the packet takes through network 1200 can be said to be dynamically altered in a pseudorandom way to thwart adversaries attempting to monitor network communications. The dynamic forwarding methods hereinafter described can be performed using any suitable technique and all such techniques are intended to be included in the scope of the present invention. Also, the dynamic modification of forwarding protocols can be performed alone, or in conjunction with the dynamic modification of identity parameters as described above.

It should be understood that dynamic routing methods described herein are not limited to the process described above. In another embodiment, a switch operating in accordance with a mission plan can determine multiple viable paths through the network. The switch can segment and scatter communications across the viable paths in accordance with a pseudorandom algorithm defined by the mission plan. For example, with reference to FIG. 12, a switch 1206 can receive a communication which is segmented into two packets. Operating in accordance with the mission plan, switch 1206 can send one packet through router 1208 and the other packet directly to router 1210. The communication is then reassembled at the destination, e.g. server 1214. In such an embodiment, the switch 1206 can vary the path data packets will travel according to a pseudorandom function. One skilled in the art will recognize that this technique may be scaled to networks that include any number of switches and/or routers.

Figure 14:
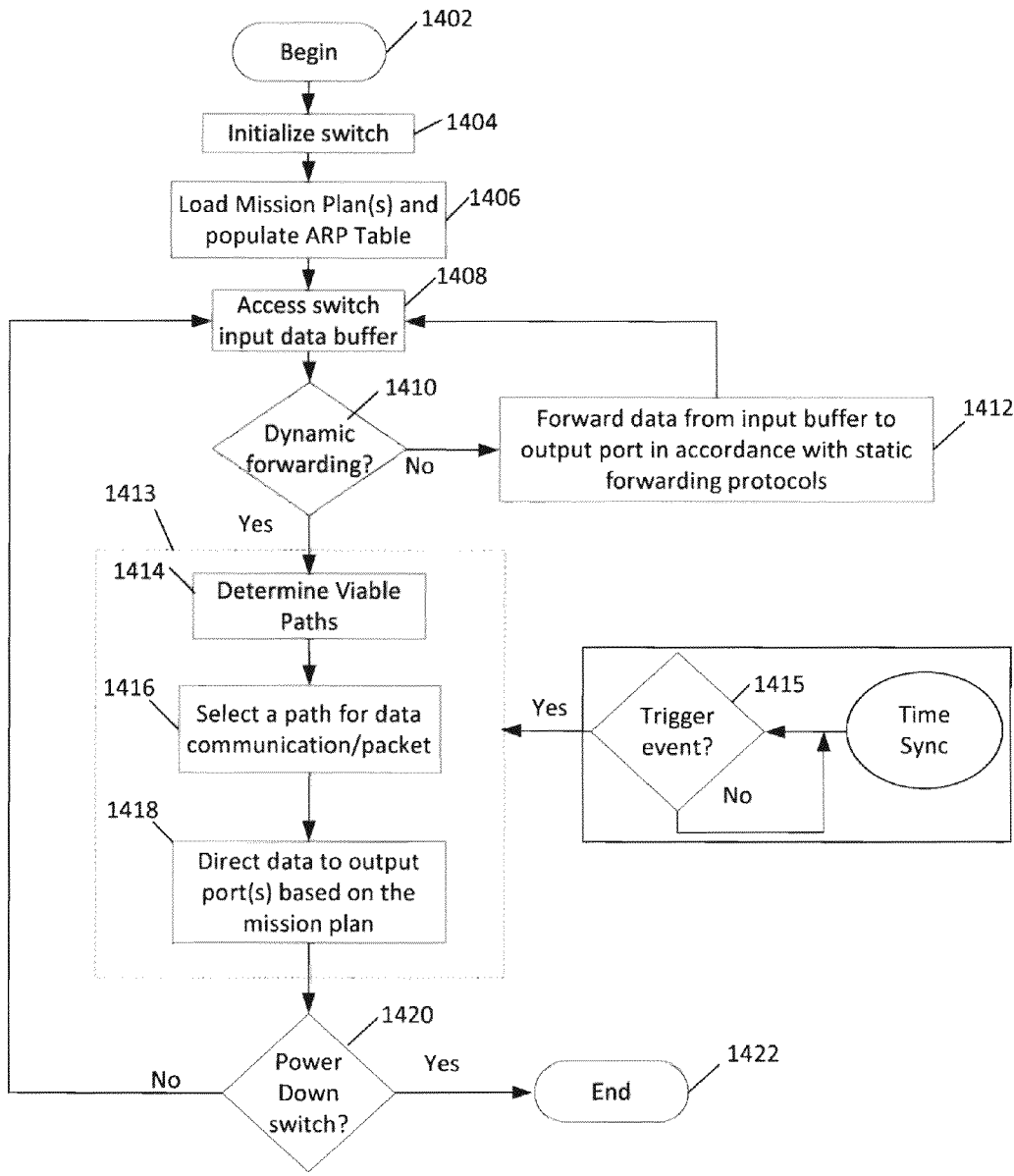
FIG. 14 is a flowchart that is useful for understanding the operation of a switch in FIG. 1.

Notably, the dynamic routing process described above can also occur independently of one or more of the MTT functions described in relation to FIG. 13. Referring now to FIG. 14, there is provided a flowchart which summarizes the operation of a switch according to one embodiment where the forwarding protocol used by the router varies in accordance with a mission plan. The process begins at step 1402 when the switch is powered up and continues to step 1404 where switch application software is initialized for executing the methods described herein. In step 1406, one or more mission plans are loaded from a memory location within the switch and the ARP table is populated. At this point, the switch is ready to begin processing data and proceeds to do so at step 1408, where it accesses a received data packet from an input data buffer of the switch. In step 1410 a determination is made as to whether the switch is operating in a dynamic forwarding mode. If not, the process proceeds to step 1412 and data is forwarded to the default port associated with the next hop in the path to the destination host. Alternatively, if the switch is operating in accordance with a dynamic forwarding mode (1410: Yes), the process continues on to steps 1414-1418 included within box 1413.

In step 1414, the switch determines a set of viable paths through the network the data packet may take in order to reach its destination node. These paths can be determined based on the mission plan. For example, the mission plan can be aware of a number of paths a data packet can take through the network to go from one point to the other. The switch can determine which of these paths are available according to the currently active mission plan. In step 1416 a single path is selected to send the packet based on a pseudorandom selection process which is defined by a mission plan. A check for the occurrence of a trigger event also occurs in step 1415. As discussed above in relation to FIG. 13, the trigger event determined in step 1415 will trigger an immediate re-determination of the current MTT status (e.g., current status of false identity parameter values) at that time. Once the path is selected, the data packet is directed to an output port at step 1418 toward an adjacent node specified as the next destination for the packet. In certain embodiments, the mission plan can direct the switch to generate additional noise in the network. In these embodiments, step 1418 also includes sending the packet to one or more additional ports in an effort to flood the network with extraneous packets and mask the behavior of the network.

In step 1420, a determination is made as to whether the switch has been commanded to power down. If so, the process ends at step 1422; otherwise, the process returns to 1408. In step 1408 the process continues and the next data packet is accessed from the router's input data buffer.

Figure 15:
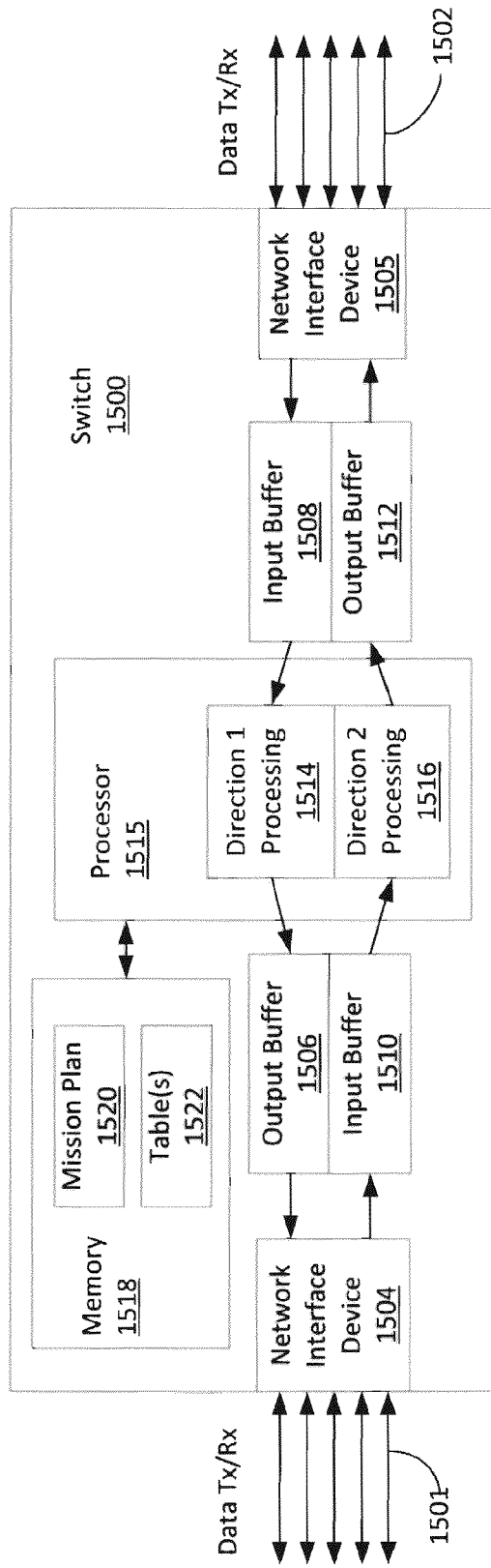
FIG. 15 is an example of a switch that can be used to implement methods for routing data packets in accordance with the present invention.

Referring now to FIG. 15, a block diagram of switch 1500 is shown. The switch 1500 has at least two data ports 1501, 1502, each of which can correspond to a respective network interface device 1504, 1505. As shown in FIG. 15, switch 1500 can have a plurality of data ports, each connecting to a different network and/or computing device. Data received at any of ports 1501 is processed at network interface device 1504 and temporarily stored at an input buffer 1510. The processor 1515 accesses the input data packets contained in input buffer 1510 and performs any necessary routing procedures as described herein, i.e. direction 2 processing 1516. The modified data packets are passed to output buffer 1512 and subsequently transmitted from port 1502 using network interface device 1505. Similarly, data received at port 1502 is processed at network interface device 1505 and temporarily stored at an input buffer 1508. The processor 1515 accesses the input data packets contained in input buffer 1508 and performs any necessary routing procedures as described herein, i.e. direction 1 processing 1514. The modified data packets are passed to output buffer 1506 and subsequently transmitted from port 1501 using network interface device 1504. In each module, dynamic routing of data packets are performed by processor 1515 in accordance with a mission plan 1520 and/or one or more tables 1522 stored in a memory 1518.

Aside from its routing functions (and the need to potentially manage dynamic routing protocols), the operation of the switch 1500 is similar in many respects to that of the modules 105-107, 113, 114. Still, it should be appreciated that the operations of the switch 1500 is also different in some ways. For example, unlike the modules, the switch will never be entirely inactive since it is always needed to at least perform conventional forwarding functions when the network is active. Still, some of the operations of the switch can be transitioned between an active mode and an inactive mode in a way that is similar to the modules. For example, the transformative function performed by the switch, involving dynamic modification of identity parameters (step 1324 of FIG. 13), can be transitioned between an active mode and an inactive (bypass) mode. When in the active mode, the dynamic modification of identity parameters can be performed by the switch. When in the inactive or bypass mode, identity parameters are not dynamically modified, although forwarding functions are still active. Notably, a mission plan can use switches (in a manner similar to that described above with respect to the modules) to vary the location where identity parameter manipulations are performed. Such actions can be performed exclusively by one or more switches and/or routers as shown in FIG. 12, or can be performed in conjunction with other devices, such as modules, bridges, and firewalls. The mission plan used by the switch can be updated in a way that is similar to that described herein with respect to the modules, except that conventional forwarding functions with a static ARP table can remain enabled during times when a new mission plan is being loaded. Alternatively, as described above, the loading and activation of a new mission plan can cause a trigger event to occur whereby all data received in the input buffer after the trigger event will be processed using the updated mission plan.

The selection of identity parameters to be manipulated by a switch, and the way that they are manipulated can be similar to the approach described above with respect to the modules. For example, the selection of identity parameters and the selection of false identity parameter values can be determined by a pseudorandom process. The process and/or the seed values for such process are respectively determined by the mission plan associated with the network. The switch 1500 will make changes to the identity parameter values and/or the selection of identity parameters to be manipulated in accordance with the occurrence of one or more trigger events as described above with reference to the modules. These trigger events can be generated as a function of time, can be determined by the occurrence of events or both. Examples of the events referred to herein can include a user command, a timing interval, and a detection of a potential network security threat, as discussed above.

Types of Identity Parameters that can be Varied

Referring now to FIG. 16, there is provided a list of some of the identity parameters that can be manipulated by the modules 105-107, 113, 114 and/or by bridge 115. Each of the parameters listed in FIG. 16 is included in a data communication included in a network using a TCP/IP communication protocol. Most of the information types listed in FIG. 16 are well known to those skilled in the art. However, a brief description of each type of information and its use as an identity parameter is provided herein. Also provided is a brief discussion of the ways in which each identity parameter can be manipulated.

IP Address. An IP Address is a numerical identifier assigned to each computing device participating in a computer network where the network uses the well known Internet Protocol for communication. The IP address can be a 32 bit or 128 bit number. For purposes of the present invention, the IP address number can be changed to a false value that is selected randomly (e.g. using a pseudorandom number generator). Alternatively, the false IP address value can be randomly selected from a predetermined list of false values (e.g. a list specified by a mission plan). The source and destination IP addresses are included in header portion of a data packet. Accordingly, manipulation of these values is performed by simply changing by using packet manipulation techniques which change the IP header information. When the packet arrives at a second module (the location of which can be manipulated), the false IP address values are transformed back to their true values. The second module uses the same pseudorandom process (or its inverse) to derive the true IP address value based on the false value.

MAC Address. A MAC address is a unique value assigned to a network interface device by a manufacturer and stored in an onboard ROM. For purposes of the present invention, the source and/or destination MAC address can be changed to a false value that is selected randomly (e.g. using a pseudorandom number generator). Alternatively, the false MAC value can be randomly selected from a predetermined list of false values (e.g. a list specified by a mission plan). The source and destination MAC addresses are included in header portion of data packet. Accordingly, manipulation of these values is performed by simply changing an Ethernet header information of each packet. When the packet arrives at a second module (the location of which can be manipulated), the false MAC address values are transformed back to their true values. A module receiving a packet will use the same pseudorandom process (or its inverse) to derive the true MAC address value based on the false value.

Network/Subnet. In some embodiments, the IP address can be thought of as a single identity parameter. However, an IP address is generally defined as including at least two parts which include a network prefix portion and a host number portion. The network prefix portion identifies a network to which a data packet is to be communicated. The host number identifies the particular node within a Local Area Network (LAN). A sub-network (sometimes referred to as a subnet) is a logical portion of an IP network. Where a network is divided into two or more sub-networks, a portion of the host number section of the IP address is used to specify a subnet number. For purposes of the present invention, the network prefix, the subnet number and the host number can each be considered to be a separate identity parameter. Accordingly, each of these identity parameters can be separately manipulated independently of the others in a pseudorandom way. Moreover, it will be appreciated that a data packet will include a source IP address and a destination IP address. Accordingly, the network prefix, the subnet number and host number can be manipulated in the source IP address and/or the destination IP address, for a total of six different variable identity parameters that can be manipulated in a pseudorandom way. A module receiving a packet will use the same pseudorandom process as an originating node (or the inverse of such process) to derive the true Network/subnet information value based on the false value.

TCP Sequence. Two client computers communicating with each other on opposite sides of a TCP session will each maintain a TCP sequence number. The sequence number allows each computer to track how much data it has communicated. The TCP sequence number is included in the TCP header portion of each packet which is communicated during the session. At the initiation of a TCP session, the initial sequence number value is randomly selected. For purposes of the present invention, the TCP sequence number can be manipulated as an identity parameter in accordance with a pseudorandom process. For example, the TCP sequence number can be changed to a false value that is selected randomly (e.g. using a pseudorandom number generator). When the packet is received at a different module of the network (the location of which will be dynamically varied), the TCP sequence number can be transformed from a false value back to a true value, using an inverse of the pseudorandom process.

Port Number. A TCP/IP port number is included in the TCP or UDP header portion of a data packet. Ports as used in the TCP/IP communication protocol are well known in the art and therefore will not be described herein in detail. The port information is contained within the TCP header portion of the data packet. Accordingly, manipulation of the port information is accomplished by simply modifying the TCP header information to change a true port value to a false port value. As with the other identity parameters discussed here, the port number information can be manipulated or transformed to a false value in accordance with a pseudorandom process at a first module. The port information can later be transformed from a false value to a true value at a second module, using an inverse of the pseudorandom process.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for use in a switch connecting a plurality of devices to a dynamic computer network, the method comprising:
   receiving, by a communication device, a data communication that includes a plurality of identified parameters associated with a source computing device and a destination computing device, wherein a first set of said plurality of identity parameters are pseudorandomly modified to specify false information based on a pseudorandom function and a seed value specified in a first mission plan;
   performing non-repudiation operations by (1) logging said plurality of identity parameters and (2) time-stamp recording at least one of said pseudorandom function and said seed value;
   selecting a path for said data communication using at least one false identity parameter of said first set by referencing a table relating to a plurality of ports of said switch to a plurality of physical addresses to determine an output port that corresponds to a physical address of the destination of said data communication; and
   forwarding said data communication to said output port corresponding to said path.

2. The method of claim 1, further comprising loading said first mission plan onto said switch, wherein said table is populated based on said first mission plan.

3. The method of claim 2, further comprising pseudorandomly modifying said plurality of identity parameters of said data communication such that a second set of identity parameters specify false information based on said first mission plan.

4. The method of claim 3, further comprising pseudorandomly modifying said table based on said first mission plan, wherein said path for said data communication is selected using at least one false identity parameter of said second set.

5. The method of claim 4, wherein said pseudorandom modifications occur in response to a trigger event.

6. The method of claim 5, further comprising determining the occurrence of said trigger event based on at least one of a user command, a timing interval, and a detection of a potential network security threat.

7. The method of claim 6, wherein said trigger event is determined in accordance with said first mission plan.

8. The method of claim 1, wherein said switch is connected to a plurality of networks, the method further comprising:
loading a plurality of mission plans into said switch each corresponding to one of said plurality of networks, wherein said table includes a plurality of sections, each populated based on one of said plurality of mission plans.

9. The method of claim 8, further comprising pseudorandomly modifying said plurality of identity parameters of said data communication such that a second set of identity parameters specify false information based on a second mission plan that specifies a second pseudorandom function and a second seed value, wherein said data communication is forwarded to a second dynamic network operating in accordance with said second mission plan.

10. The method of claim 8, further comprising pseudorandomly modifying said plurality of identity parameters of said data communication to exclusively specify true information, wherein said data communication is forwarded to a third network that is static.

11. The method of claim 1, further comprising determining a plurality of viable paths for said data communication, wherein said selecting a path comprises pseudorandomly selecting one of said plurality of viable paths based on said first mission plan.

12. The method of claim 1, further comprising:
receiving a second data communication including a plurality of identity parameters which exclusively specify true information; and
selecting a path for said second data communication using at least one said identity parameter by referencing a portion of said table to determine an output port that corresponds to a physical address of the destination of said second data communication; and
forwarding said second data communication to said output port corresponding to said path.

13. The method of claim 1, further comprising selectively determining whether said identity parameters of said data communication should be pseudorandomly modified based on a determination of a relative security level of said data communication, wherein said selective determination is based on at least one of the content of the data communication, the source of the data communication, the destination of the data communication, the user transmitting the data communication, and the user receiving the data communication.

14. A method for use in a switch connecting a plurality of devices to a dynamic computer network, the method comprising:
receiving, by a communication device, a data communication that includes a plurality of identified parameters associated with a source computing device and a destination computing device, wherein a first set of said plurality of identity parameters are pseudorandomly modified to specify false information based on a pseudorandom function and a seed value specified in a first mission plan;
selecting a path for said data communication using at least one false identity parameter of said first set by referencing a table relating a plurality of ports of said switch to a plurality of physical addresses to determine an output port that corresponds to a physical address of the destination of said data communication;
forwarding said data communication to said output port corresponding to said path;
determining values of said false information which are in use by said dynamic computer network;
discarding said data communication if said false information specifies a source node identity that is not consistent with said false information currently in use by said dynamic computer network; and
enabling non-repudiation of said data communication, wherein said non-repudiation comprises at least one of recording said plurality of identity parameters and recording a time stamp and said pseudorandom function.

15. A switch for forwarding data in a dynamic computer network comprising:
a plurality of ports configured to receive and transmit data packets that include a plurality of identity parameters;
a memory configured to store a mission plan that specifies a pseudorandom function, a seed value and at least one table, populated based on said mission plan, relating said plurality of ports with a plurality of physical addresses of devices connected to said switch;
at least one processing unit configured to:
identify a received data packet as one of dynamic and static, wherein a dynamic data packet includes a first set of said identity parameters that have been modified to specify false identity parameters based on said mission plan, and wherein a static data packet includes identity parameters that exclusively specify true identity parameters;
perform non-repudiation operations by time-stamp recoding at least one of said pseudorandom function and said seed value;
select an output port from said plurality of ports to forward said data packet through using at least one false identity parameter of said set by referencing said table; and
forward said data packet through said output port.

16. The switch of claim 15, wherein said output port is selected pseudorandomly based on said mission plan.

17. The switch of claim 16, wherein said at least one processing unit is further configured to pseudorandomly modify said plurality of identity parameters of said data packet such that a second set of identity parameters specify false information based on said mission plan.

18. The switch of claim 17, wherein said at least one processing unit is further configured to pseudorandomly modify said table based on said mission plan, wherein said output port for said data packet is selected using at least one false identity parameter of said second set.

19. The switch of claim 15, wherein said at least one processing unit is further configured to filter said data packet by comparing at least one of said identity parameters to a set of filtering rules.

20. The switch of claim 15, wherein said memory is configured to store a plurality of mission plans each corresponding to one of said plurality of networks, and wherein said table includes a plurality of sections, each populated based on one of said plurality of mission plans.

21. The switch of claim 20, wherein said at least one processing unit is further configured to pseudorandomly modify said plurality of identity parameters of said data packet such that a second set of identity parameters specify false information based on a second mission plan that specifies a second pseudorandom function and a second seed value, wherein said data packet is forwarded to a second dynamic network operating in accordance with said second mission plan.

22. A switch for forwarding data in a dynamic computer network comprising:
   a plurality of ports configured to receive and transmit data packets that include a plurality of identity parameters;
   a memory configured to store a mission plan that specifies a pseudorandom function, a seed value and at least one table, populated based on said mission plan, relating said plurality of ports with a plurality of physical addresses of devices connected to said switch;
   at least one processing unit configured to:
      identify a received data packet as one of dynamic and static, wherein a dynamic data packet includes a first set of said identity parameters that have been modified to specify false identity parameters based on said mission plan, and wherein a static data packet includes identity parameters that exclusively specify true identity parameters; select an output port from said plurality of ports to forward said data packet through using at least one false identity parameter of said set by referencing said table; and
      forward said data packet through said output port;
   wherein said at least one processing unit is further configured to determine values of said false identity parameters which are in use by said dynamic computer network, said at least one processing device does not forward said data communication to a next node if said false identity parameters specifies a source node identity that is not consistent with said false identity parameters currently in use by said network, and said memory is further configured to store at least one of said plurality of identity parameters of said data communication, a time stamp, and a pseudorandom function that defines said false identity parameters in relation to said time stamp and a seed value.

* * * * *